US011901623B2

(12) United States Patent
He et al.

(10) Patent No.: US 11,901,623 B2
(45) Date of Patent: Feb. 13, 2024

(54) RF SYSTEMS ON ANTENNA AND METHOD OF FABRICATION

(71) Applicant: Georgia Tech Research Corporation, Atlanta, GA (US)

(72) Inventors: Xuanke He, Atlanta, GA (US); Emmanouil Tentzeris, Atlanta, GA (US); Ryan Alexander Bahr, Peachtree City, GA (US); Yunnan Fang, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 17/405,661

(22) Filed: Aug. 18, 2021

(65) Prior Publication Data

US 2023/0261385 A1 Aug. 17, 2023

Related U.S. Application Data

(60) Provisional application No. 63/067,038, filed on Aug. 18, 2020.

(51) Int. Cl.

*H01Q 1/22* (2006.01)
*H01Q 13/02* (2006.01)
*H01Q 13/18* (2006.01)
*H01Q 1/36* (2006.01)

(52) U.S. Cl.

CPC ....... *H01Q 13/0233* (2013.01); *H01Q 1/2283* (2013.01); *H01Q 1/364* (2013.01); *H01Q 13/18* (2013.01)

(58) Field of Classification Search

CPC .. H01Q 13/0233; H01Q 1/2283; H01Q 1/364; H01Q 13/18
USPC ........................................................ 343/702
See application file for complete search history.

(56) References Cited

U.S. PATENT DOCUMENTS

| | | | | |
|---|---|---|---|---|
| 6,373,447 | B1 | 4/2002 | Rostoker et al. | |
| 8,330,259 | B2 | 12/2012 | Castany et al. | |
| 2006/0028378 | A1* | 2/2006 | Gaucher .............. | H01Q 1/2283 343/872 |
| 2017/0110790 | A1* | 4/2017 | Kim ..................... | H01Q 21/205 |
| 2019/0346814 | A1* | 11/2019 | Fruehling ................. | H03L 7/26 |
| 2021/0351901 | A1* | 11/2021 | Hassan ................... | H04L 5/143 |
| 2021/0381994 | A1* | 12/2021 | Rebergen ............... | B41M 3/006 |

OTHER PUBLICATIONS

A. Ghannam, C. Viallon, D. Bourrier, and T. Parra, "Dielectric microwave characterization of the su-8 thick resin used in an above ic process," in 2009 European Microwave Conference (EuMC), Sep. 2009, pp. 1041-1044.

(Continued)

*Primary Examiner* — Peguy Jean Pierre
(74) *Attorney, Agent, or Firm* — Meunier Carlin & Curfman LLC

(57) ABSTRACT

An antenna system includes an antenna waveguide having a waveguide surface. A set of printed electronics includes conductors deposited onto the waveguide surface of the antenna waveguide. The system further includes at least one transceiver integrated circuit (IC), the transceiver integrated circuit having a surface assembly, wherein the surface assembly is adhesively coupled to the antenna waveguide and directly connected to the waveguide surface of the antenna waveguide.

23 Claims, 17 Drawing Sheets

(56) References Cited

OTHER PUBLICATIONS

B. K. Tehrani, C. Mariotti, B. S. Cook, L. Roselli, and M. M. Tentzeris, "Development, characterization, and processing of thin and thick inkjet-printed dielectric films," Organic Electronics, vol. 29, pp. 135-141, 2016. [Online], Available: http://www.sciencedirect.com/science/article/pii/S1566119915302032.
B. Zhang, Z. Zhan, Y. Cao, H. Gulan, P. Linnr, J. Sun, T. Zwick, and H. Zirath, "Metallic 3-d printed antennas for millimeter- and submillimeter wave applications," IEEE Transactions on Terahertz Science and Technology, vol. 6, No. 4, pp. 592-600, Jul. 2016.
D. G. Kam, D. Liu, A. Natarajan, S. K. Reynolds, and B. A. Floyd, "Organic packages with embedded phased-array antennas for 60-ghz wireless chipsets," IEEE Transactions on Components, Packaging and Manufacturing Technology, vol. 1, No. 11, pp. 1806-1814, 2011.
D. Liu and S. Reynolds, "An aperture-coupled patch antenna in rfic package for 60 ghz applications," in Proceedings of the 2012 IEEE International Symposium on Antennas and Propagation, Jul. 2012, pp. 1-2.
E. Macdonald, R. Salas, D. Espalin, M. Perez, E. Aguilera, D. Muse, and R. B. Wicker, "3d printing for the rapid prototyping of structural electronics," IEEE Access, vol. 2, pp. 234-242, Dec. 2014.
H. Yao, S. Sharma, R. Henderson, S. Ashrafi, and D. MacFarlane, "Ka band 3d printed horn antennas," in 2017 Texas Symposium on Wireless and Microwave Circuits and Systems (WMCS), Mar. 2017, pp. 1-4.
K. Kotz'e and J. Gilmore, "Slm 3d-printed horn antenna for satellite communications at x-band," in 2019 IEEE-APS Topical Conference on Antennas and Propagation in Wireless Communications (APWC), 2019, pp. 148-153.
Cheng, Xin, Qunli Rao, and Hongzhen Yang. "A Controllable Method of the Preparation of Electroless Nickel-Boron Films on Ag Substrate." Metal Finishing 110.1 (2012): 22-26.
P. Ratajczak, "Design of a 3d printed omnidirectional antenna for 60 ghz application," in 2019 13th European Conference on Antennas and Propagation (EuCAP), 2019, pp. 1-4.
R. Czarny, T. Q. V. T. Q. Hoang, B. Loiseaux, G. Bellomonte, R. Lebourgeois, A. Leuliet, L. Qassym, C. Galindo, J. Heintz, N. Penin, L. Fourier, C. Elissalde, J. Silvain, T. Fournier, C. Jegou, and P. Pouliguen, "High permittivity, low loss, and printable thermoplastic composite material for rf and microwave applications," in 2018 IEEE Conference on Antenna Measurements Applications (CAMA), 2018, pp. 1-4.
S. Li, H. T. Nguyen, T. Chi, C. Li, N. Cahoon, A. Kumar, G. Freeman, D. Harame, and H. Wang, "Performance of v-band on-chip antennas in globalfoundries 45nm cmos soi process for mm-wave 5g applications," in 2018 IEEE/MTT-S International Microwave Symposium—IMS, Jun. 2018, pp. 1593-1596.
S. Seok, N. Rolland, and P. . Rolland, "Design, fabrication and characterization of bcb polymer embedded 60 ghz parallel-coupled bpf," in 2010 Proceedings 60th Electronic Components and Technology Conference (ECTC), 2010, pp. 501-505.
T. Lin, R. Bahr, M. M. Tentzeris, P. M. Raj, V. Sundaram, and R. Tummala, "Novel 3d-/inkjet-printed flexible on-package antennas, packaging structures, and modules for broadband 5g applications," in 2018 IEEE 68th Electronic Components and Technology Conference (ECTC), 2018, pp. 214-220.
T. Merkle and R. Götzen, "Millimeter-wave surface mount technology for 3-d printed polymer multichip modules," IEEE Transactions on Components, Packaging and Manufacturing Technology, vol. 5, No. 2, pp. 201-206, Feb. 2015.
T. Merkle, R. Götzen, J. Choi, and S. Koch, "Polymer multichip module process using 3-d printing technologies for d-band applications," IEEE Trans. Microw. Theory Techn., vol. 63, No. 2, pp. 481-493, Feb. 2015.
TGP2615 15-19GHz 6-Bit Digital Phase Shifter, Qorvo, Dec. 2019, rev. B.
V. Gjokaj, J. Papapolymerou, J. D. Albrecht, B. Wright, and P. Chahal, "A compact receive module in 3-d printed vivaldi antenna," IEEE Transactions on Components, Packaging and Manufacturing Technology, vol. 10, No. 2, pp. 343-346, 2020.
W. E. McKinzie, D. M. Nair, B. A. Thrasher, M. A. Smith, E. D. Hughes, and J. M. Parisi, "60-ghz2_2ltcc patch antenna array with an integrated ebg structure for gain enhancement," IEEE Antennas and Wireless Propagation Letters, vol. 15, pp. 1522-1525, 2016,.
X. He, B. K. Tehrani, R. Bahr, W. Su, and M. M. Tentzeris, "Additively manufactured mm-wave multichip modules with fully printed "smart" encapsulation structures," IEEE Transactions on Microwave Theory and Techniques, vol. 68, No. 7, pp. 2716-2724, 2020.
X. He, Y. Fang, R. A. Bahr, and M. M. Tentzeris, "Rf systems on antenna (soa): a novel integration approach enabledby additive manufacturing," in 2020 IEEE MTT-S International Microwave Symposium (IMS), Jun. 2020.
Y. Fang, J. D. Berrigan, Y. Cai, S. R. Marder, and K. H. Sandhage, "Syntheses of nanostructured cu- and ni-based micro-assemblies with selectable 3-d hierarchical biogenic morphologies," J. Mater. Chem., vol. 22, pp. 1305-1312, 2012. [Online], Available: http://dx.doi.org/10.1039/C1JM13884G.
Y. Zhang and J. Mao, "An overview of the development of antenna-in-package technology for highly integrated wireless devices," Proceedings of the IEEE, vol. 107, No. 11, pp. 2265-2280, 2019.

* cited by examiner

RF SYSTEMS ON ANTENNA AND METHOD OF FABRICATION

CROSS REFERENCE TO RELATED APPLICATIONS

This application claims priority to and incorporates entirely by reference U.S. Provisional Patent Application Ser. No. 63/067,038 filed on Aug. 18, 2020, entitled RF Systems on Antenna and Method of Fabrication.

STATEMENT OF GOVERNMENT INTEREST

This invention was made with government support under FA9550-18-1-0191 awarded by the Air Force Office of Scientific Research. The government has certain rights in the invention.

BACKGROUND OF THE DISCLOSURE

Electronic systems are becoming more and more complex, and current trends for user demands in 5G and Internet-of-Things (IoT) applications require ever-increasing levels of integration with higher performance targets at lower and lower costs. All of these factors previously led to the development of System-on-Chip (SoC) or System-on-Package (SoP) technologies, where entire systems are highly integrated onto a single microelectronic chip, or stacked together into a package. Recent works have also demonstrated integrated antennas on-chip or on-package. However, these antennas are usually very small, and consequently high frequency, since the output needs to be within the same order of magnitude as the size of a chip, so as to not use up valuable chip or packaging area.

Similarly, new technologies in wireless communications, particularly in the RF domain, have created vastly interconnected devices, which have brought the Internet closer to everyone. With the new 5G applications rapidly approaching, more and more devices will be added to the radio frequency (RF) spectrum, with everything from appliances to autonomous vehicles connected wirelessly to the Internet. The vast range of devices and the environments in which these technologies will need to operate poses a great challenge to users and designers. On the one hand, base station designers need to consider the environment and the area that they serve, while on the other hand balancing the costs of catering to different environments. The wide range of uses for 5G means that there is no one size fits all implementation.

A need continues to exist in the art of wireless communications to take advantage of manufacturing techniques that allow for ultimate economies in the use of space for antenna circuits and maintain appropriate functionality.

BRIEF SUMMARY OF THE DISCLOSURE

In one embodiment, an antenna system includes an antenna waveguide having a waveguide surface. A set of printed electronics includes conductors deposited onto the waveguide surface of the antenna waveguide. The antenna system further includes at least one transceiver integrated circuit (IC), the transceiver integrated circuit having a surface assembly, wherein the surface assembly is adhesively coupled to the antenna waveguide and directly connected to the waveguide surface of the antenna waveguide.

In another embodiment of an apparatus for wireless communications, the apparatus includes an antenna body having a plurality of antenna assemblies connected by a waveguide support structure, wherein the waveguide support structure defines a printing surface surrounding at least one waveguide opening extending through the waveguide support structure. At least one antenna waveguide is connected to the waveguide support structure and accessible through a respective waveguide opening. A substrate is positioned on the printing surface, and an antenna transmission feed structure is positioned on the substrate and connects a respective one of the antenna assemblies to a respective antenna waveguide through the respective waveguide opening. The antenna transmission feed structure routes input electrical waveforms to the respective waveguide for wireless transmission from the antenna body.

In a method of constructing an antenna system, steps include printing an antenna body having at least one antenna waveguide and attaching at least one transceiver integrated circuit to the antenna waveguide. The steps further include depositing a set of printed electronics on the antenna waveguide, wherein the printed electronics connect the transceiver integrated circuit to the antenna waveguide.

DETAILED DESCRIPTION OF THE DISCLOSURE

An exemplary system-on-antenna (SoA) is disclosed for fully integrated RF modules, antenna waveguide, thermal management, and packaging. In some embodiments, this exemplary SoA utilizes additive manufacturing, which is a rapid, on-demand, and low-cost fabrication technology. Instead of wasting valuable wafer or packaging area to create antennas, an example method uses 3D and inkjet printing to embed a Ku-band radar module into a 10 dBi horn antenna. However, conventional manufacturing techniques (e.g., plastic injection molding, casting, laser, and ultrasonic cutting) can also be employed to fabricate the antenna waveguide. In some examples, the exemplary System on Antenna (SoA) topologies can be fabricated using additive manufacturing. Indeed, either design methodology can allow antennas to be compactly integrated within RF modules, in which AM can provide an even greater degree of integrations, and sets the foundation for on-demand customizable SoA modules for a multitude of applications ranging from 5G+ and IoT to implanted medical and wearable applications.

Terms in this disclosure are given their broadest plain meaning. For example, in discussing chips and integrated circuits used for antenna electronics, this disclosure references surfaces assemblies of those electronic components. As used herein, a surface assembly includes any tangible electronic hardware component or combination of components considered a distinct apparatus having a desired computing function, including circuit components, processing components, electrical connectors, and substrates and housings holding the same together for use.

In one non-limiting embodiment, an additive manufacturing method can be used to create phased array "tile" module systems with fully integrated RF electronics built directly into the antenna structure. This example method of integration is dubbed System on Antenna (SoA) and utilizes the space on the surface of the antenna as space to house RF electronics making the SoA an integrated and encapsulated packaged module. As an example, a proof-of-concept 2×2 phased array tile featuring 4 horn antennas, each with its own phase shifter integrated circuit, was fabricated and measured with a beam steering capability of 20 degrees. With additional tiles, these modules can be massively scalable to create arbitrarily shaped phased arrays for use in communication systems or radars. In one non-limiting embodiment, the System on Antenna (SoA) is fully additively manufactured, which includes the antenna array, integrated circuit interconnects, the RF feed structure, and the DC feed structure. The additive manufacturing method enables a high level of integration between antenna assemblies and electronics and serves as the primary design tool to create low-cost and highly customizable phased array designs which can enable rapid deployment of large-scale 5G communication and IoT systems.

Figure 1:
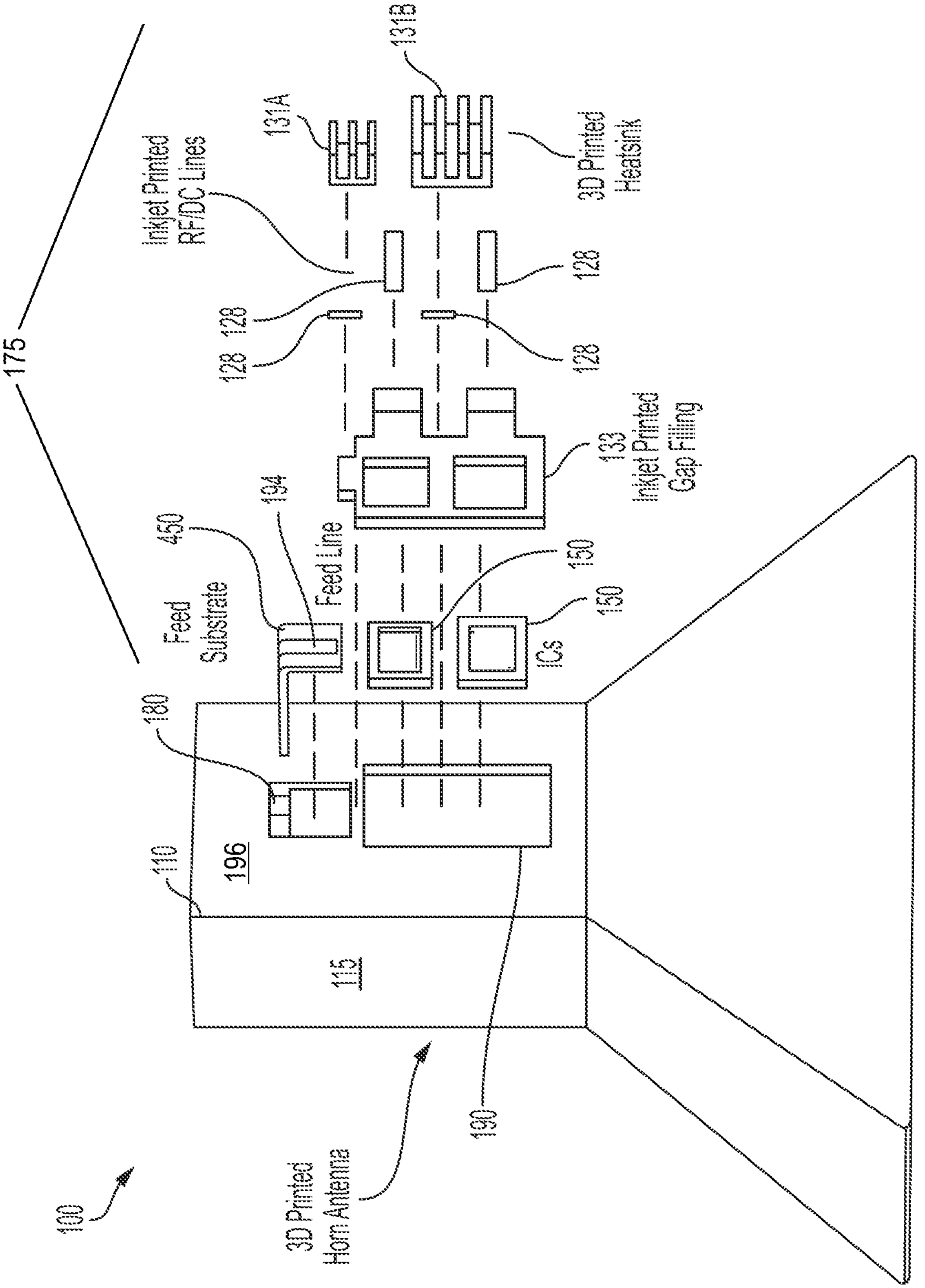
FIG. 1 is an exploded view of a System on Antenna proof-of-concept topology, demonstrating the many layers needed to be assembled. The ICs are an amplifier and a voltage controlled oscillator (VCO), with the amplifier amplifying the VCO signal to generate a wide range of signals based on the VCO tuning voltage. The figure illustrates 3D additively manufactured parts (e.g., the horn antenna 115, the feed substrate 450, and the heatsinks 131A, 131B) as well as two dimensionally printed inkjet parts (e.g., the feed lines 192, the gap filling 133, the RF feedlines 520, and the DC feedlines 525).

In certain non-limiting embodiments, the fully additive manufacturing of the SoA module includes four steps: 1) 3D printing and metallizing the antenna structure, with the built-in housing cavity for integrated circuits; 2) selectively metallizing the microstrip antenna feed; 3) attaching computer hardware chips and inkjet printing the gap fill and RF and DC interconnects between a voltage controlled oscillator (VCO), a power amplifier (PA) and an antenna feed; and 4) 3D printing the heat sink structure for heat dissipation. These fabrication steps can be seen in the exploded example of FIG. 1 which shows the assembly process, with everything, except for the integrated circuits, additively manufactured. In FIG. 1, the 3D and inkjet parts are labeled.

Figure 2A:
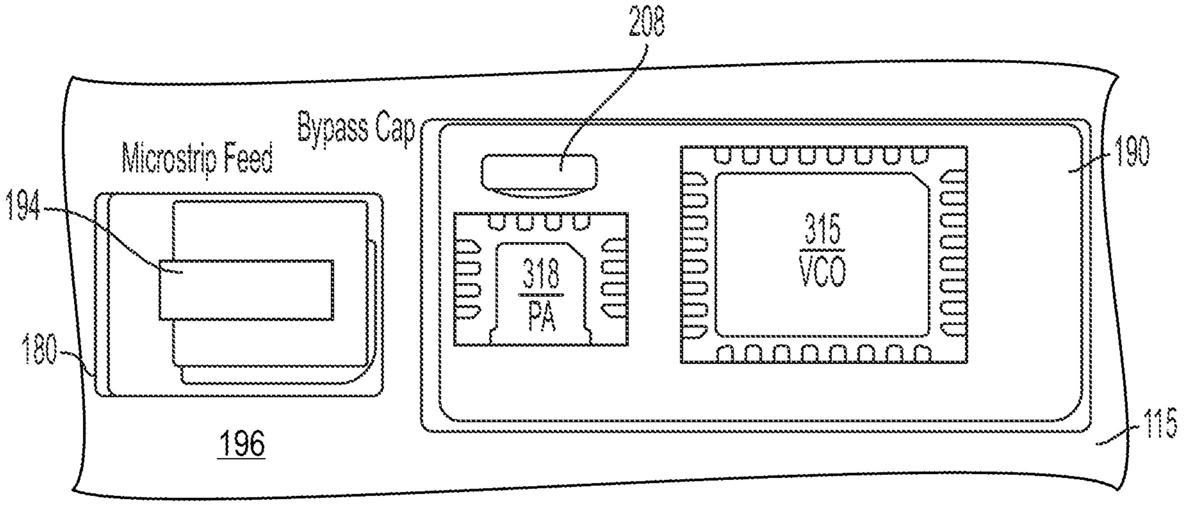
FIG. 2A illustrates fabrication of the chip attachment utilizing inkjet printing. The chips for the VCO 315 and the power amplifier 318 (PA), the "L-shaped" microstrip output feed line 194 and bypass capacitor 208 for the PA are placed into the built-in housing cavity 190 in the antenna 100.
Figure 2B:
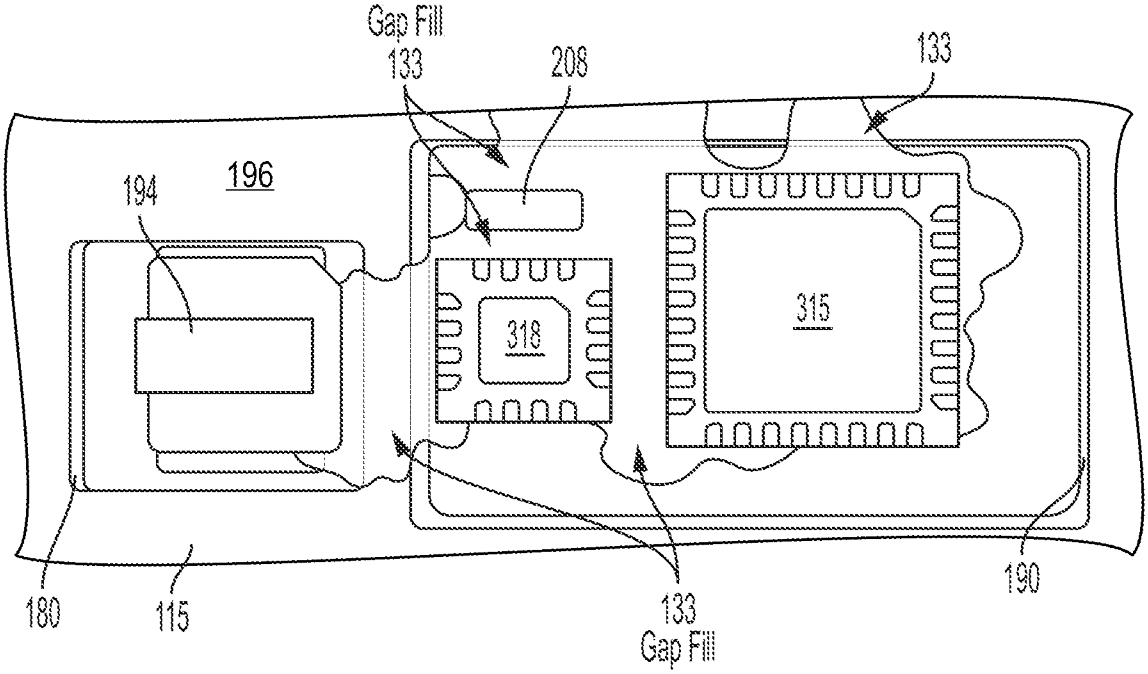
FIG. 2B illustrates the structure of FIG. 2A with the addition of SU8 gap filling 133.
Figure 2C:
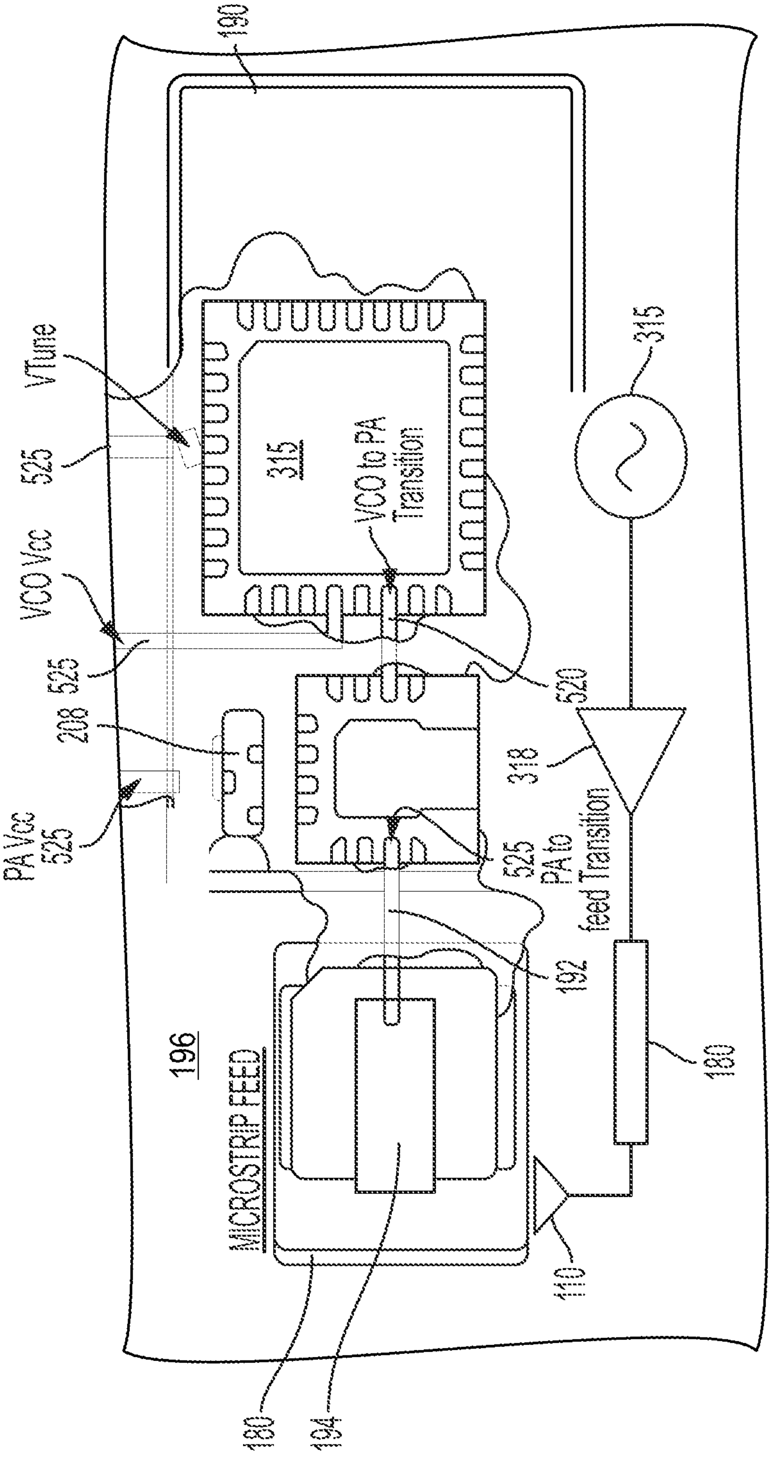
FIG. 2C illustrates the structure of FIG. 2B with the addition of RF 520 and DC 525 inkjet printed lines deposited in two dimensions, with equivalent schematic.
Figure 3A:
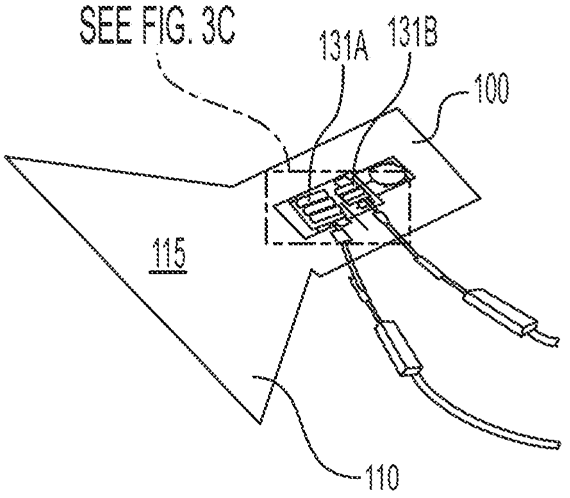
FIG. 3A illustrates a top view of the System on Antenna (SoA) module prototype with enlarged heat sink 131A, 131B (inset).
Figure 3B:
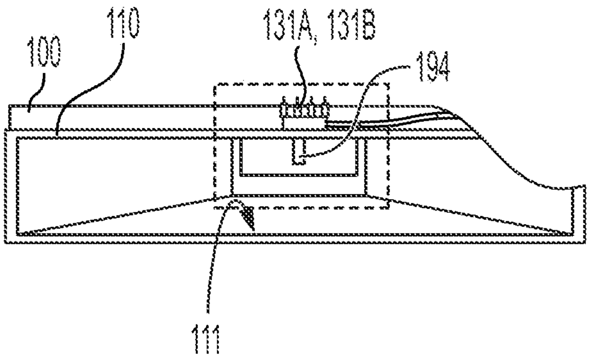
FIG. 3B illustrates a side view of the structure of FIG. 3A clearly showing the L-shaped microstrip feed 194 inside the horn antenna 100.
Figure 3C:
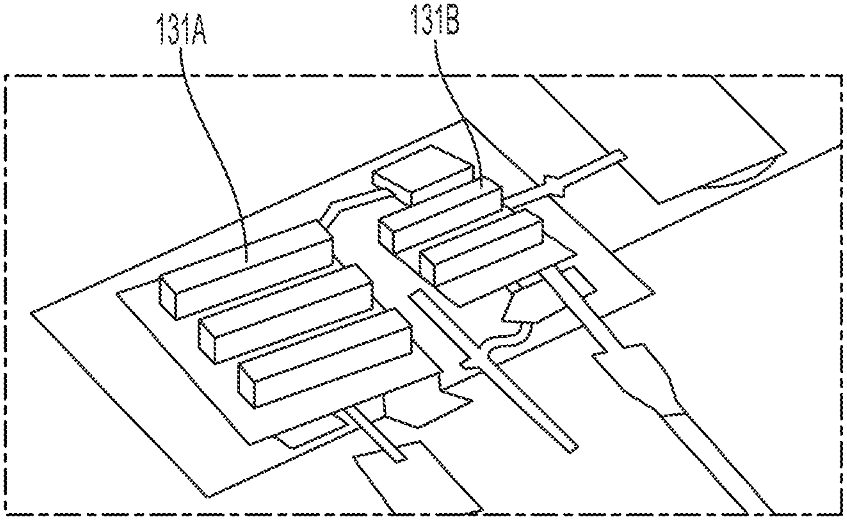
FIG. 3C illustrates a perspective view of the heat sink identified in FIG. 3A.

In one example illustrated in FIGS. 2-4, a Ku-Band pyramidal horn antenna 100 is shown, having an opening of 11.5 mm×54 mm, attached to a standard WR62 waveguide section 110. This design is a 3D printable structure on the stereolithography Formlab Form 2 printer with the high temperature resin at 50 μm printed layer resolution. The specialized high temperature resin was used because of its heat deflection temperature of 239° C., which ensures that the structure of the antenna 100 will not bend due to later sintering steps. Cavities 180, 190 were left on the surface of the waveguide section 110 of the horn antenna 100 to allow embedding of the RF chips/integrated circuits 150 and the microstrip probe feeding structure 194. The cavities 180, 190 were designed to be 1 mm deep (the thickness of the quad flat no-leads (QFNs) packaging) so that the integrated circuits lay flat with the surface of the antenna 100 when placed within the housing cavity 190. The housing cavity 190 was made wide (8 mm) to house all the integrated circuits 150 and a bypass capacitor 208, and have around 0.5 mm margin on either side for the printing of the dielectric gap fill 133, explained later. The entire horn antenna 100 was metallized first using electroless plating and then electroplated. The metallization of the antenna 100 was created through electroless deposition of copper using a modified procedure to those described in noted reference [7]. Specifically, in this example, a water-based solution, which contained 0.19 M cupric sulfate (anhydrous) and 0.67M sodium potassium tartrate tetrahydrate, was prepared with its pH adjusted to 12.5 using an aqueous NaOH solution. An appropriate amount of formaldehyde (37% in water) was then added to the solution to provide a concentration of 220 mM. With the antenna sensitized and activated, antenna 100 was incubated in the resulting copper electroless bath for 30 min at room temperature with occasional agitation. The resulting thickness of electroless deposited copper was around 3 μm. While the electroless plating provides a conductive seed layer of copper that is bonded to the surface molecules of the 3D printed polymer of the horn antenna 100, an electroplating process enables the ability to grow additional copper in a rapid and uniform manner. A copper acetate solution was created from 6% acidic acid and copper. The amp-hours per area can be used to approximate the thickness of the coating. To double the thickness of the metallization in a uniform manner, a 0.12 A/h over a surface area of 64.9 square centimeter surface to increase the thickness by 4.9 μm and constant agitation was used for deposition to create a uniform coating; see reference [8]. Other dimensions and materials appropriate for 5G+ and IoT applications may be employed.

From previous literature discussing 3D printed horn antennas, an overall antenna feed structure 192 (e.g., conductive traces 128 and microstrip lines 194 connecting integrated circuits across a surface of the antenna) is rarely discussed, due to the difficulty in selectively metallizing the overall antenna feed structure 192. In one non-limiting embodiment, the overall antenna feed structure 192 needs to effectively connect the RF chips/integrated circuits 150 on the outside of the antenna 100 to another surface of the antenna, such as but not limited to, the inside surface 111 of the waveguide 110 to excite the antenna 100. Therefore, a microstrip probe feeding structure 194 is designed as an "L-shaped" 3D printed piece with one side inkjet-printed using EMD 5730 silver nanoparticle (SNP) ink to fashion a 50Ω microstrip line 196. The microstrip probe feeding structure 194 is then sintered at 150° C., and then individually inserted into the microstrip cavity 180 designed into the antenna 100. The bent L-shaped microstrip probe feeding structure 194 lies compact and flush with the surface of the antenna 100 and does not significantly affect the insertion loss or bandwidth compared to an equivalent coaxial probe feed of prior constructions.

In another non-limiting example illustrated in FIGS. 2A, 2B, 2C, 3A, 3B, a radar transmitter device includes a voltage controlled oscillator 315 (HMC632LP5E) and a power amplifier 318 (HMC451LP3), both quad flat no-lead packages (QFNs). To attach the QFNs to the antenna 100, they are first flipped over in this example and epoxied down into the built-in housing cavity 190 in the antenna 100 to expose respective metallic pads. In other examples, the transmitter device and other integrated circuits can be attached right-side up. In the configurations for which the ICs are attached upside down, due to the gaps that form in between the chips of integrated circuits 150 and the walls of the housing cavity 190, as well as between the chips/integrated circuits 150 and the microstrip probe feeding structure 194, the space can be filled in with dielectric material, referred to herein as a gap-filling 133, enabling the ultimate installation of inkjet-printed, flat, low-parasitic interconnecting electrical traces, i.e., interconnects 128, thereon. In one non-limiting embodiment, the dielectric material used to fill the gaps is SU-8 ink (MicroChem) printed at 60° C. platten temperature. The gap-filling 133 accounts for the deep housing cavity 190 that needs to be filled. Thus, the drop density was increased to 16000 DPI for rapid filling and required approximately 30 layers of Su-8 to totally fill to the edges of the chip. The Su-8 underwent two UV cure cycles, once when the gap is halfway filled and one where it was fully filled to ensure that the entire gap is fully UV cured. After fully UV curing and hard baking of the SU-8, the Su-8 hardens allowing for further metallization of the surface using silver nanoparticles (SNP), realizing the RF connections 520 and DC connections 525. The process is demonstrated in FIGS. 2A and 2B, showing the step-by-step processes of connecting all the components of the antenna system using two dimensional inkjet printing for the microstrip probe feeding structure 194, numerous electrical traces 128, and overall antenna feed structure 192.

Heat sinks 131A, 131B are devices used to dissipate heat to the environment. Low power chips like low-noise amplifiers and passive components typically do not require the use of heat sinks, but in example embodiments, the HMC632LP5E and HMC451LP3 both consume around 1 W of power during operation, which necessitates the need for heat sinks 131A, 131B. The fact that they are also flipped over with no printed circuit board (PCB) metal on the ground paddle, further exacerbates the need for heat dissipation.

The heat sinks 131A, 131B may be 3D printed and electroplated in the same electroplating process explained above. The electroplating current and duration were increased to 50 mA and 4 hours respectively, to develop a thicker film of copper to allow better heat dissipation. The smaller dimensions of the amplifier 318, with only a footprint of 3×3 $mm^2$ provides the special considerations due to the small size. Regardless, a 3 fin, 3×3×4 $mm^3$ 3D printed copper electroplated heat sink fabricated for the amplifier was calculated to achieve 58° C./W of thermal resistivity which is less than the 78° C./W maximum rating for the chip, allowing the amplifier to be safely operated. A passivation layer of Su-8 was printed on the pads of the chips to prevent shorting. The heatsinks were attached using Arctic Silver thermal compound and the completed system with the assembled heatsink on top of the chips is shown in FIGS. 3A and 3B.

Figure 4B:
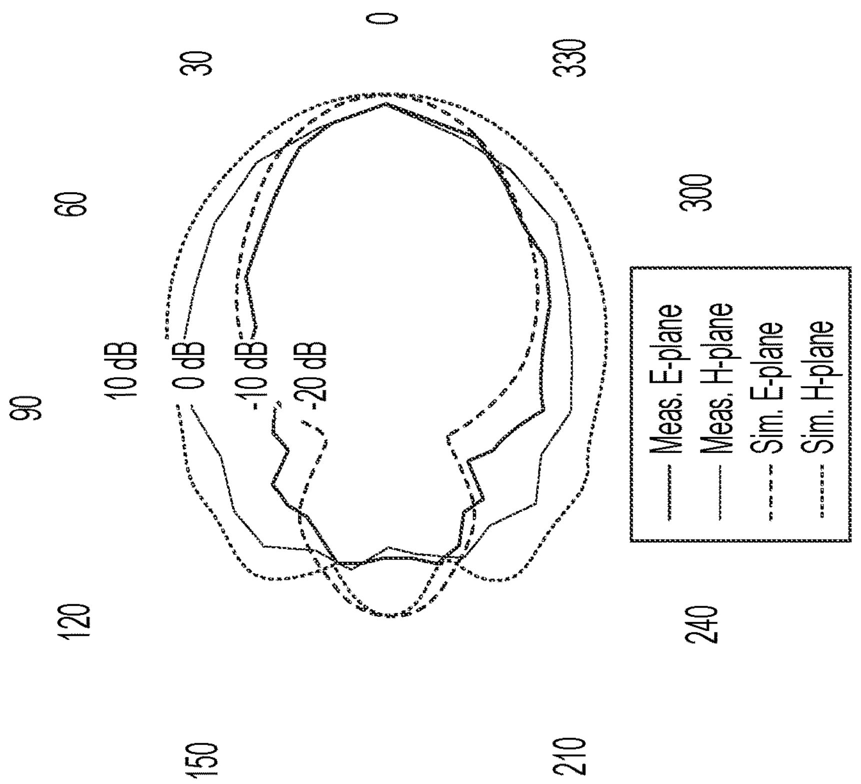
FIG. 4B illustrates a gain pattern for the horn antenna of FIG. 4A.
Figure 4A:
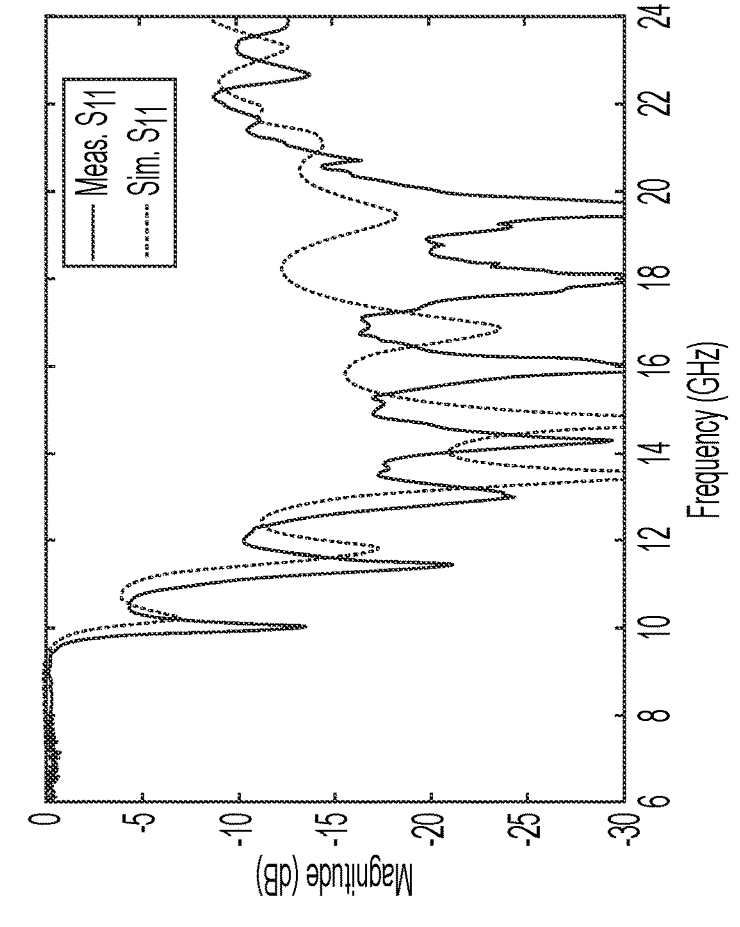
FIG. 4A illustrates simulated and measured horn antenna parameters for S11 power reflection.
Figure 5:
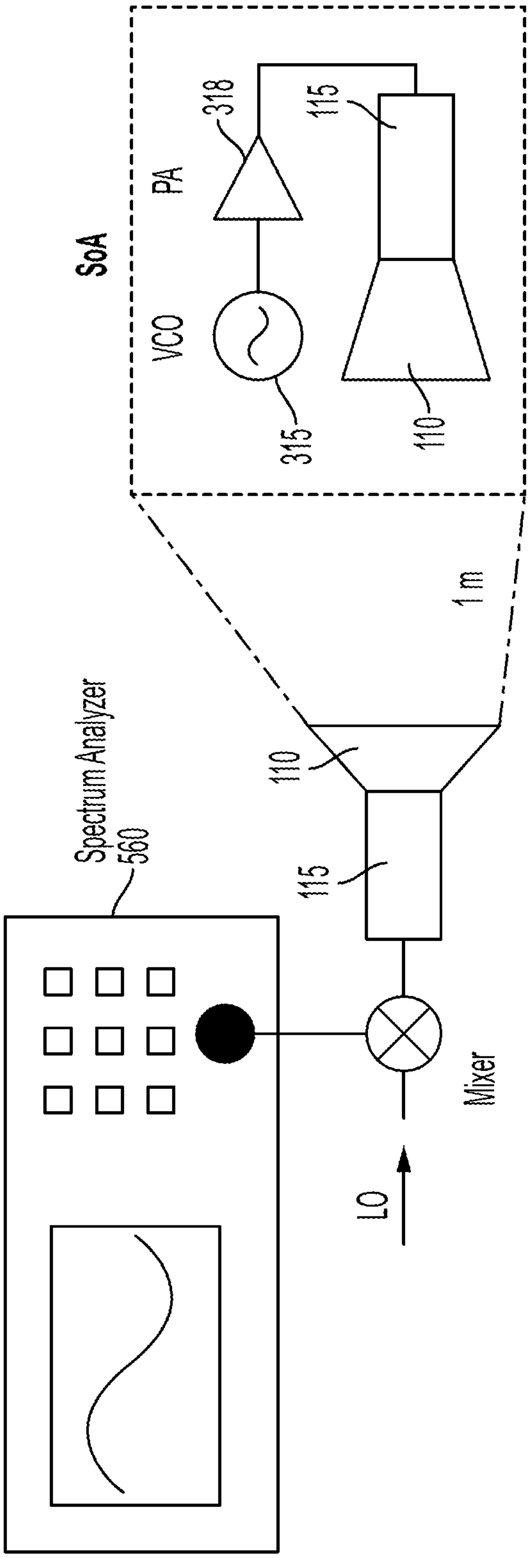
FIG. 5 illustrates a measurement setup of the SoA. The VCO on the SoA is externally adjusted to examine the frequency shifted response.

Initially, for the example of FIGS. 1-3, the horn antenna 100 was printed with a flange connection to verify its successful RF performance along with a satisfactory performance of the copper deposition. This embodiment has been illustrated in FIGS. 4-6. The input matching and gain patterns are both measured and matched with simulations closely. The gain of the antenna was measured to be 10 dBi which is only 0.5 dBi less than the simulated antenna, demonstrating that the 3D printing and copper plating process was a success and that the surface roughness of the 3D print did not have a large effect. These results are shown in FIGS. 4A and 4B. However, it was difficult to measure the standalone microstrip fed horn antenna since there was no coaxial connection to the measurement equipment. Thus only empirical experiments were conducted for the SoA by turning on the SoA and altering the tuning voltage of the VCO 315 to view the resulting frequency shift on a spectrum analyzer 560 as set forth for example in FIG. 5. A standard gain horn antenna was used as the receiver for the spectrum analyzer 560, and a mixer (ZX05-24MH-S+) was used to step down the frequency so it can be measured by the spectrum analyzer, shown in FIG. 5.

Figure 6:
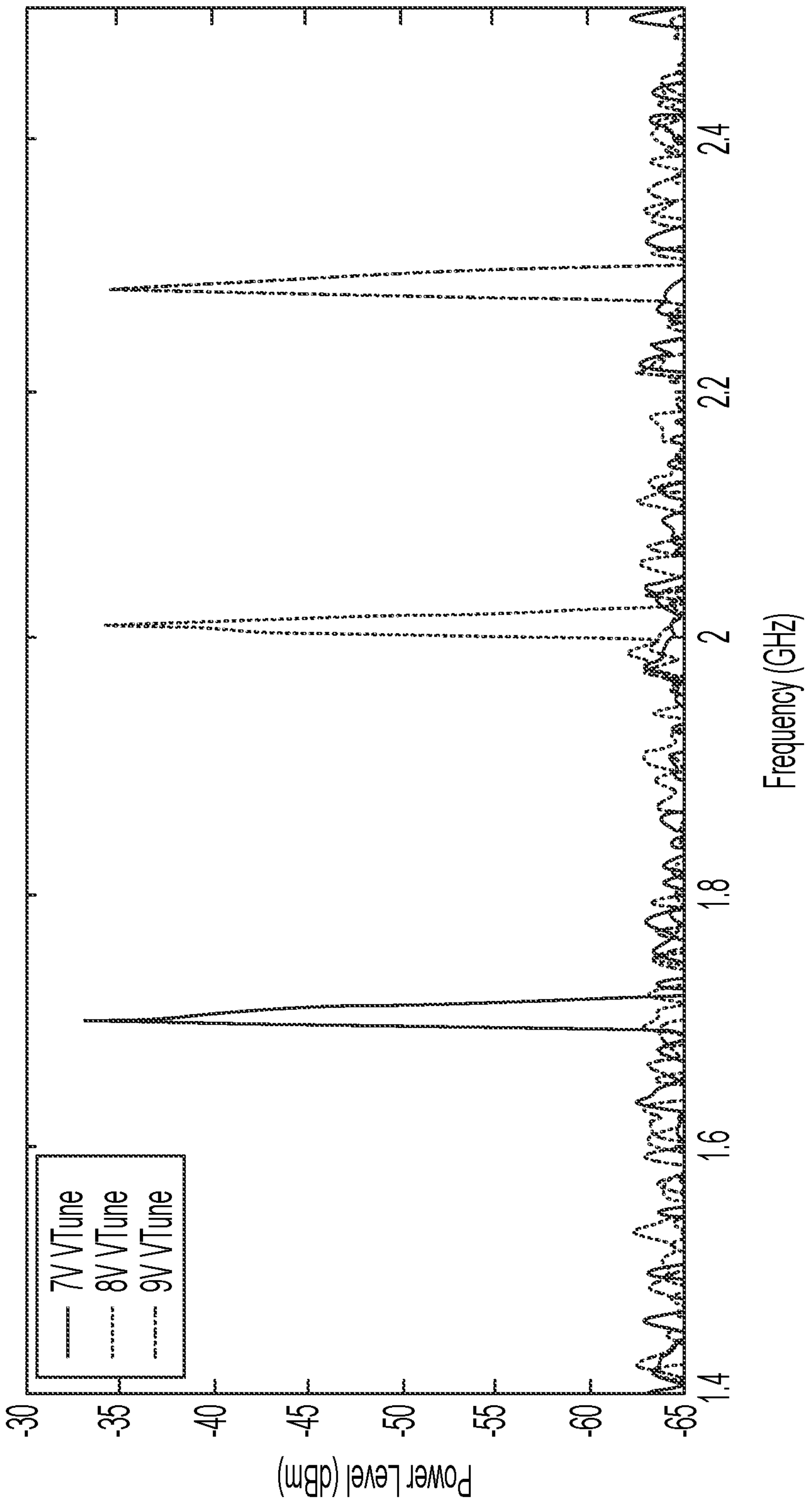
FIG. 6 illustrates received power level from the SoA, with different tuning voltages. The frequency received is 14.7 GHz, 15 GHz, and 15.26 GHz for 7V, 8V and 9V tuning voltage respectively. The frequency measured is post frequency conversion due to the mixer.

The frequency-shifted data, gathered while the example device of FIGS. 1-5 was under operation is shown in FIG. 6. When the voltage of the VCO 315 was changed from 7 to 9 volts, a frequency shift is observed in the spectrum analyzer, demonstrating that the device is operational, and the device can output a wide range of signals for potential radar applications. The received frequencies were 14.7 GHz, 15 GHz, and 15.26 GHz for 7V, 8V and 9V tuning voltage of the VCO 315 respectively, which were subsequently down converted by mixing 13 GHz. The received power level of the device is around −33.3 dBm for 9V V-tune and −33 dBm for 7V V-tune. This translates to a total system loss of 2.5-2.8 dB. The amplifier 315 was operated at maximum saturated power of 20 dBm at 15 GHz. The pathloss measured at the same distance using the reference 3D-printed flange antenna was −40.5 dB, and the mixer conversion loss is 10 dB at 2 GHz IF (intermediate frequency analysis).

The expected received signal level, assuming everything to be lossless, is around −30.5 dBm (20−40.5−10=−30.5). Thus, there is a loss of around 2.5-2.8 dB in the transition from the system on antenna SoA to the antenna.

By embedding chips and integrated circuits 150 within an antenna 100, entire systems can be fabricated directly attached to the antenna 100, eliminating the need for flanges and coax transitions and cables which drastically reduces system size and loss. Additional size is minimized by eliminating the need for a printed circuit board (PCB), since the electronic circuits are built directly on the antenna. This can be achieved with additive manufacturing techniques, since the traditional chip/PCB fabrication methods are not suitable for structures such as horn antennas due to their inherent structural non-uniformities. The SoA makes use of valuable space on the antenna which would traditionally not have been utilized. Without loss of generality, the proof-of-concept application in this paper is a radar transmitter device which can be used for tracking applications.

FIGS. 7-12 illustrate another fully additive manufactured phased array "tile" system on antenna (SoA) system is designed, fabricated and measured. The proof-of-concept 2×2 phased array system 400, illustrated in FIGS. 7A and 7B, features integrated phase shifters 407A, 407B, 407C, 407D which are used to steer the main beam, and fabricated with the RF feed 520 and DC feed 525 all built into the surface, i.e., the waveguide support structure 430, of the antenna 401, as shown in FIG. 7A. In this non-limiting example, the structure of the 2×2 antenna array system 400 is 3D printed with each antenna element 405A, 405B, 405C, 405D being fed by its own phase shifter 407A-407D with each phase shifter being individually voltage controlled as shown in the schematic of FIG. 7B. In one non-limiting embodiment, the phase shifter chosen for this system is the Qorvo TGP2615-SM 6 bit 15-19 GHz phase shifter. The antenna system 400 is designed to operate at 15 GHz Ku band. This phased array SoA is built as the building block for larger and more complex phased arrays. With these building blocks, large antenna arrays can be tiled, in ad hoc fashion, whenever larger antenna arrays are needed, or the system can be modified on-the-fly to a different shape as these tiles can be easily shifted, added or removed as shown in FIG. 7C. FIG. 7C illustrates how the tiles 470A-470F of an SoA construction may include individual antennas 405A-405D with appropriate housing cavities and microstrip cavities 180A-180E connecting antenna circuits to waveguides illustrated with waveguide caps 465A-465D. The RF feed lines 520A-520F provide appropriate interconnects.

Figure 7A:
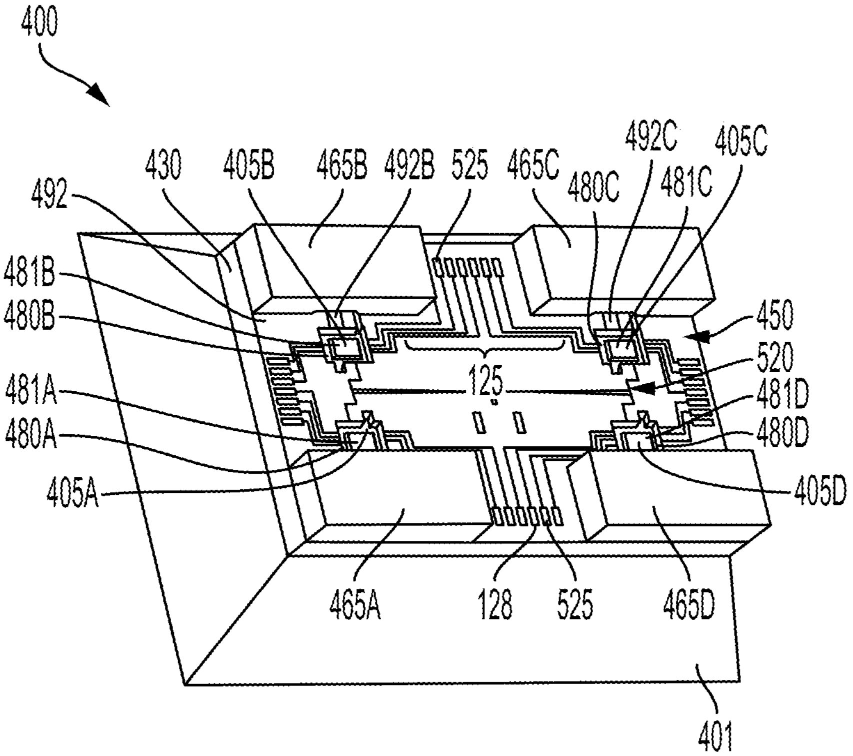
FIG. 7A illustrates a proof-of-concept additively manufactured 2×2 phased array SoA "tile."
Figure 7B:
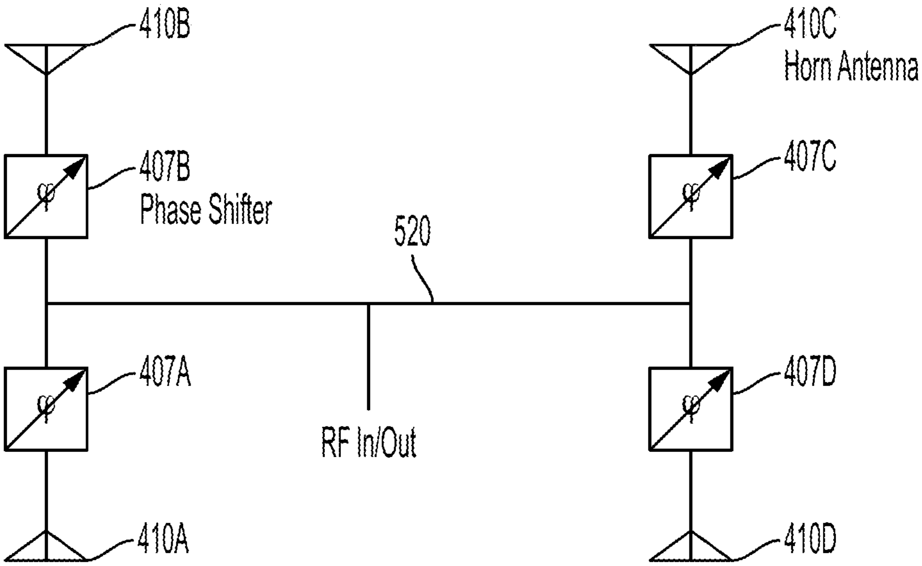
FIG. 7B illustrates a schematic of the 2×2 antenna array of FIG. 7A.
Figure 7C:
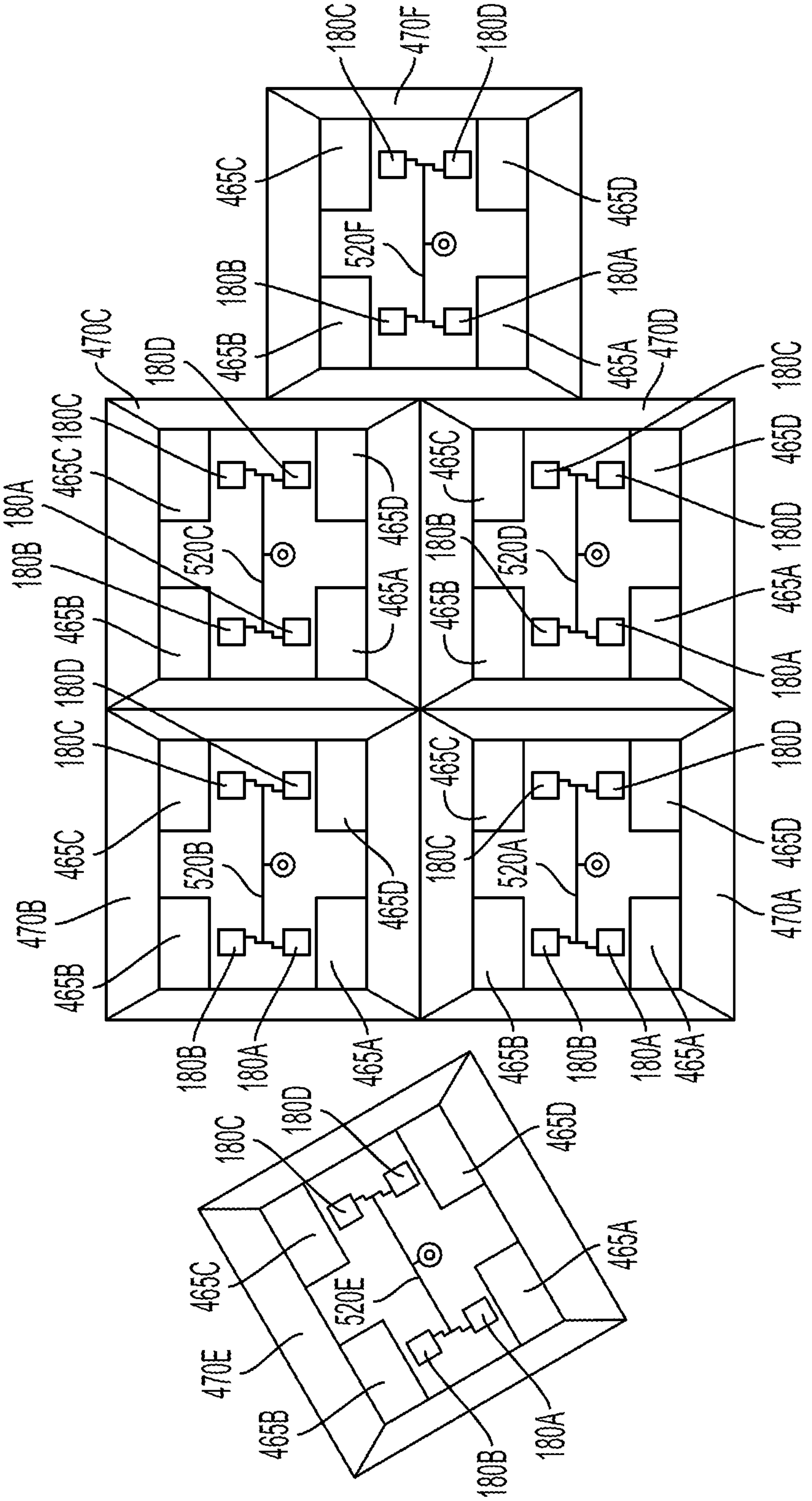
FIG. 7C illustrates a schematic of a scalable "tiled" phased array consisting of multiple 2×2 additively manufactured SoA tiles which can be modified ad hoc based on different operating environments or specifications.

In the overview example of FIG. 7A, an expansion of the concept of SoA demonstrates an all additively manufactured 2×2 phased array system 400 with integrated phase shifter integrated circuits and feeding. The SoA phased array system 400 integrates many components so that designers can create custom shaped phased arrays using a tiled approach, allowing for modular functionality in an easy to work with, plug-and-play platform. A proof-of-concept 2×2 SoA phased array "tile" allows for a 20 degree beam steering capability, in both x and y orientations, and can be extended further to incorporate more tiles for arbitrarily shaped phased arrays with higher beam steering capability as shown in FIG. 7C. Additional functionality can be added by incorporating variable gain amplifiers, which allows for full amplitude control, granting the ability to control both phase and amplitude for beamforming capability, allowing users to arbitrarily create antenna beam patterns and control beamwidth and sidelobe levels. The design techniques addressed FIGS. 7-12 and the prototype 2×2 phased array SoA clearly demonstrate the feasibility to create fully functioning, additively manufactured RF systems which are modifiable and scalable in a low-cost fashion, greatly enhancing the adoption of new wireless technologies in 5G and IoT space.

To start with the example of FIG. 7A, a horn antenna system 400 was designed at 15 GHz with a standard WR62 waveguide size. Considering FIGS. 8A-8F, a portion of a waveguide wall, such as but not limited to a waveguide support structure 430, was cut to form an opening 435A-435D, through which a microstrip probe feeding structure 194 is positioned to excite the antenna 400. The horn element aperture is square, measuring 30×30 mm, and the entire 2×2 antenna array measures 61×61 mm, due to extra space added between the antennas because of manufacturing tolerances. An important design consideration is the feeding structure of the antenna. As discussed in relation to FIGS. 1-5, the waveguide feed can be bent towards the sides of the antenna, creating a smooth surface. In this array configuration, due to the 2×2 structure, implementing the overall antenna feed structure 192 with prior technology in the art would require that two of the antenna's feeds would get covered by the other two antenna elements. Due to the nature of drop-on-demand inkjet printing, the printing surface 425 must be exposed to the inkjet-printed nozzles, thus the antenna feed needs to be exposed for all four elements. Various types of conductive ink may be used, such as silver nanoparticle ink or paste, copper paste and ink, magnesium ink or paste, or carbon-based conductive ink or paste.

Because the predominantly smooth space in between the antennas 405A, 405B, 405C, 405D is usually mainly empty, that space was repurposed for the antenna feed layer 492, exposing all four feed points to the inkjet printer. The antenna feed layer 492 may be divided in to tile sections 492A, 492B, 492C, 492D defining the respective housing cavities 490A-490D for the antennas 405A-405D and phase shifters 407A-407D, which have around 200 μm extra tolerance to make room for the inkjet-printed interconnects 428.

The antenna feed layer 492 grants a flat printing surface 425 upon which the RF lines 520 and DC lines 525 are printed. A layer of SU-8 dielectric having a thickness of 125 μm was designed to be the substrate 450 for the RF microstrip (i.e., RF feed lines 520) and the DC feed lines 525 for the phase shifters 407A-407D. The SU-8 has a dielectric constant of 2.85, tan δ of around 0.04 (see reference [25]), and is formulated according to reference [26] to adjust the viscosity and to allow the material to be inkjet-printed. An RF corporate feeding network was inkjet-printed as to feed the 4 antenna elements.

Figure 8B:
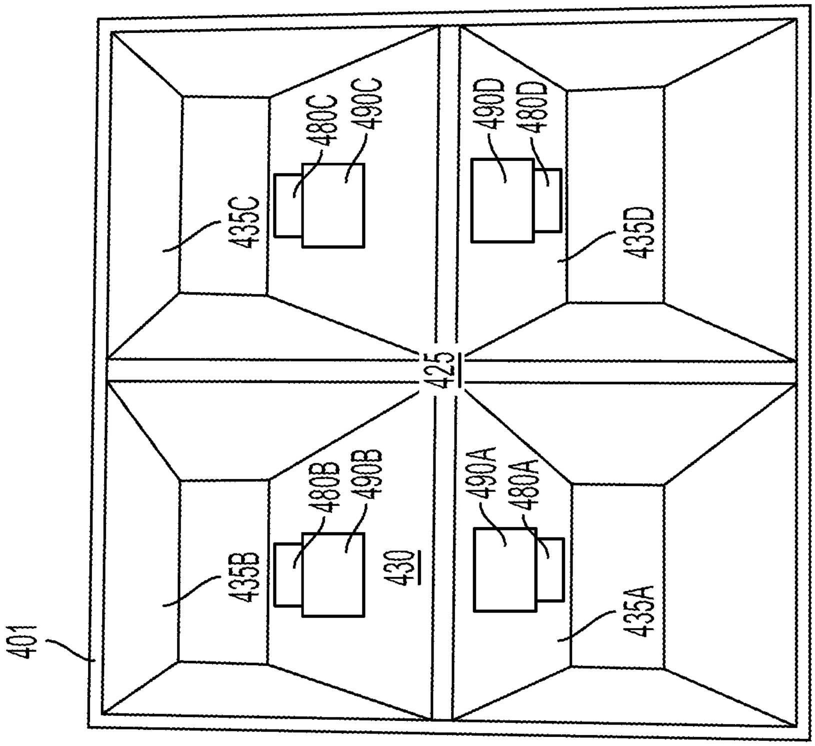
FIG. 8B illustrates the back side of the 3D printed 2×2 horn antenna structure of FIG. 8A before the application of the metallizing silver paste.
Figure 8A:
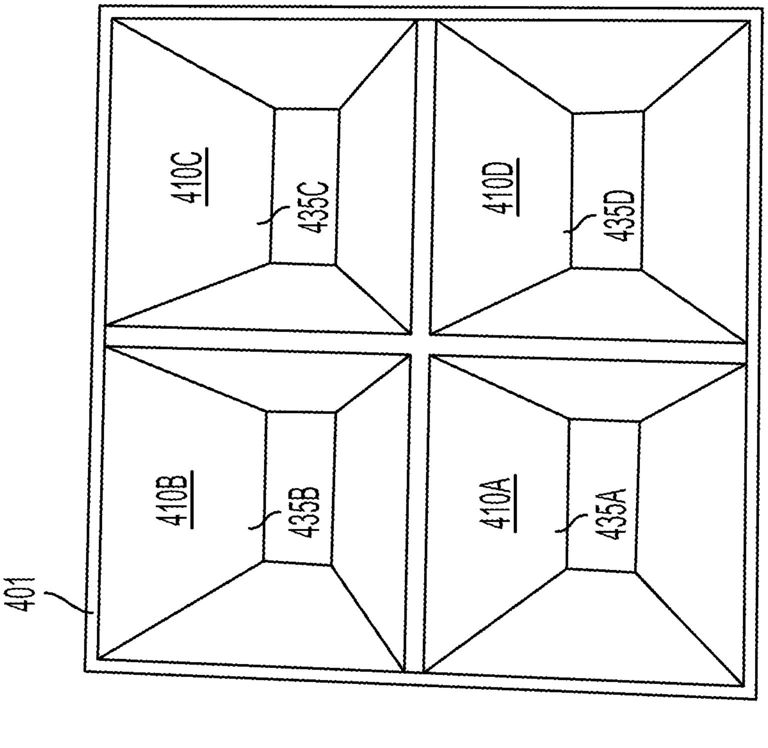
FIG. 8A illustrates the front side of the 3D printed 2×2 horn antenna structure before the application of the metallizing silver paste.
Figure 8D:
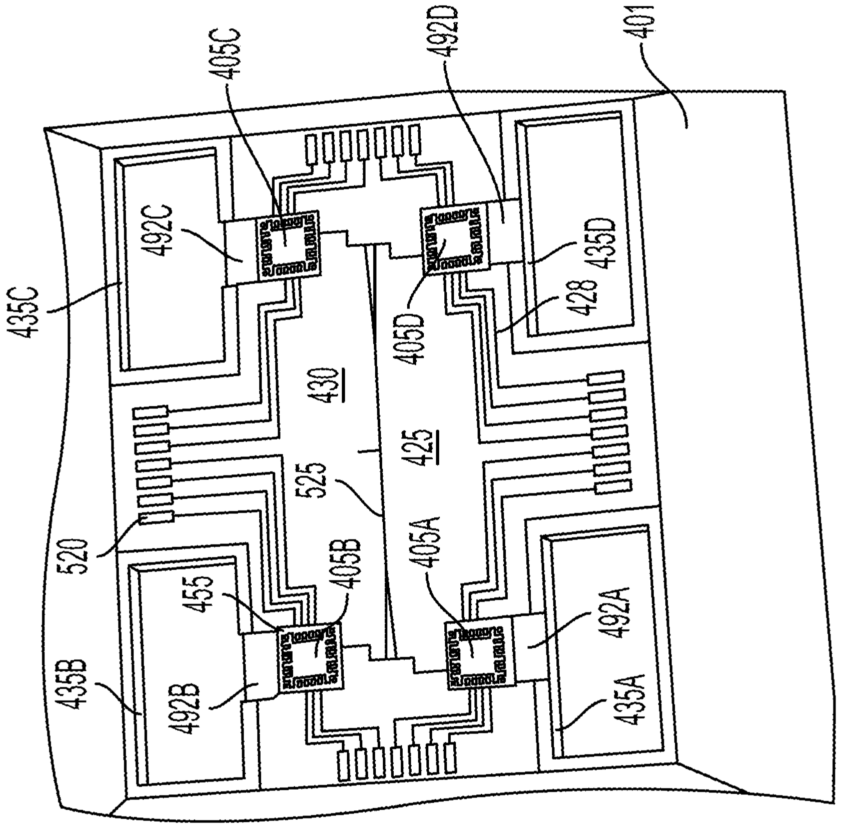
FIG. 8D illustrates Inkjet printed RF and DC feedlines on the SU-8 dielectric of FIG. 8C with the phase shifter ICs attached.
Figure 8C:
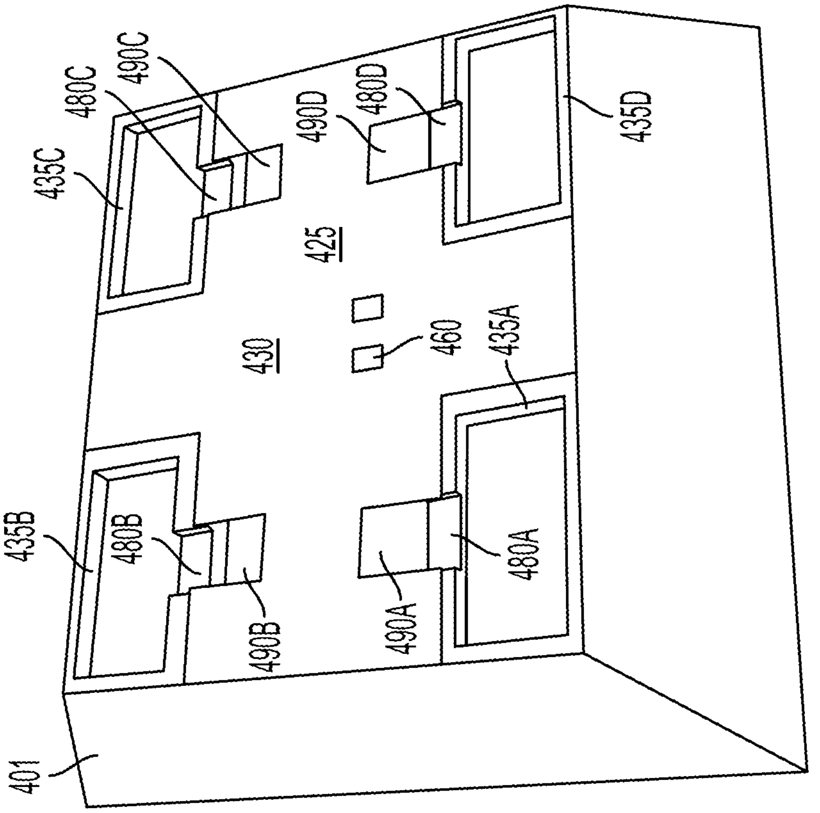
FIG. 8C illustrates the printed SU-8 dielectric layer on the backside of the antenna of FIGS. 8A and 8B with open vias for grounding and cavities for embedding the phase shifter integrated circuits (ICs).
Figure 8F:
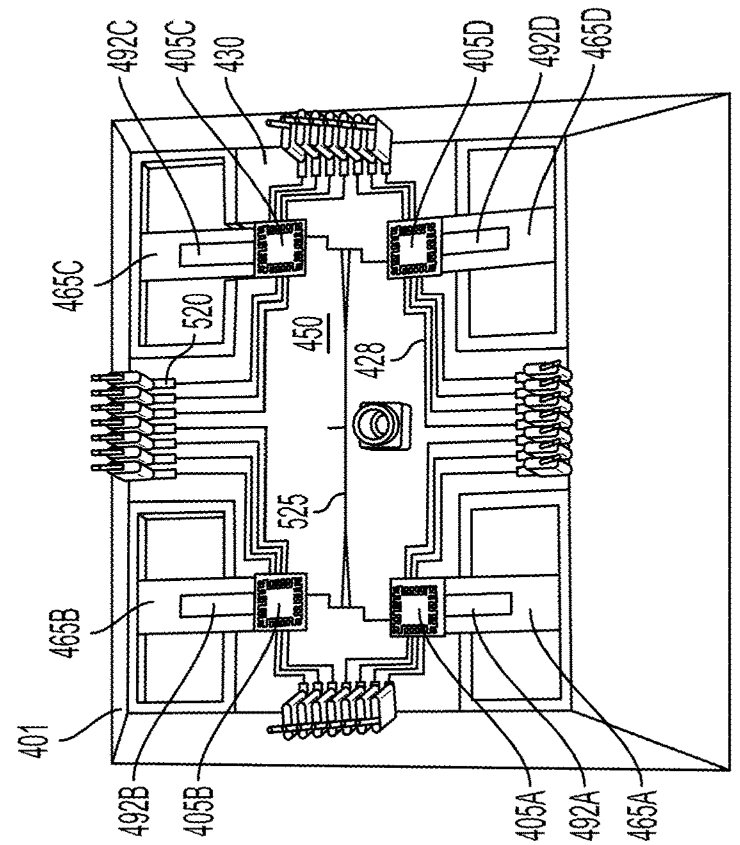
FIG. 8F illustrates an attached set of DC header pins and RF sub miniature push on micro (SMPM) connector added to FIG. 8E for testing.
Figure 8E:
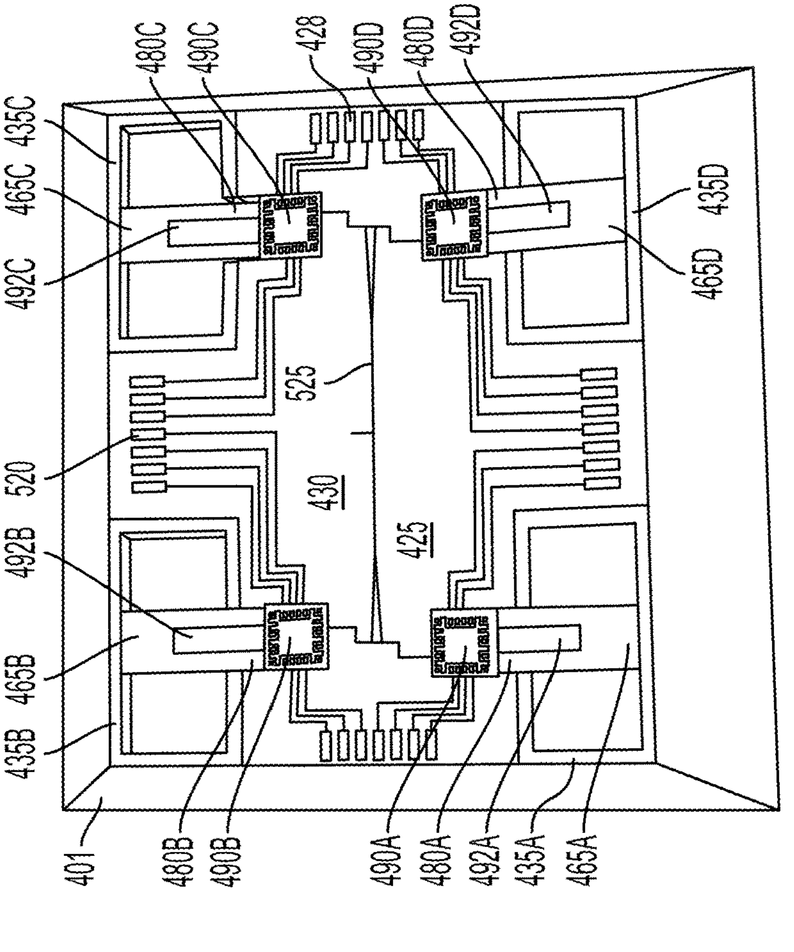
FIG. 8E illustrates the addition to FIG. 8D of Inkjet printed interconnects and attachment of the microstrip feedlines at the opening of the waveguide to the antenna.
Figure 9:
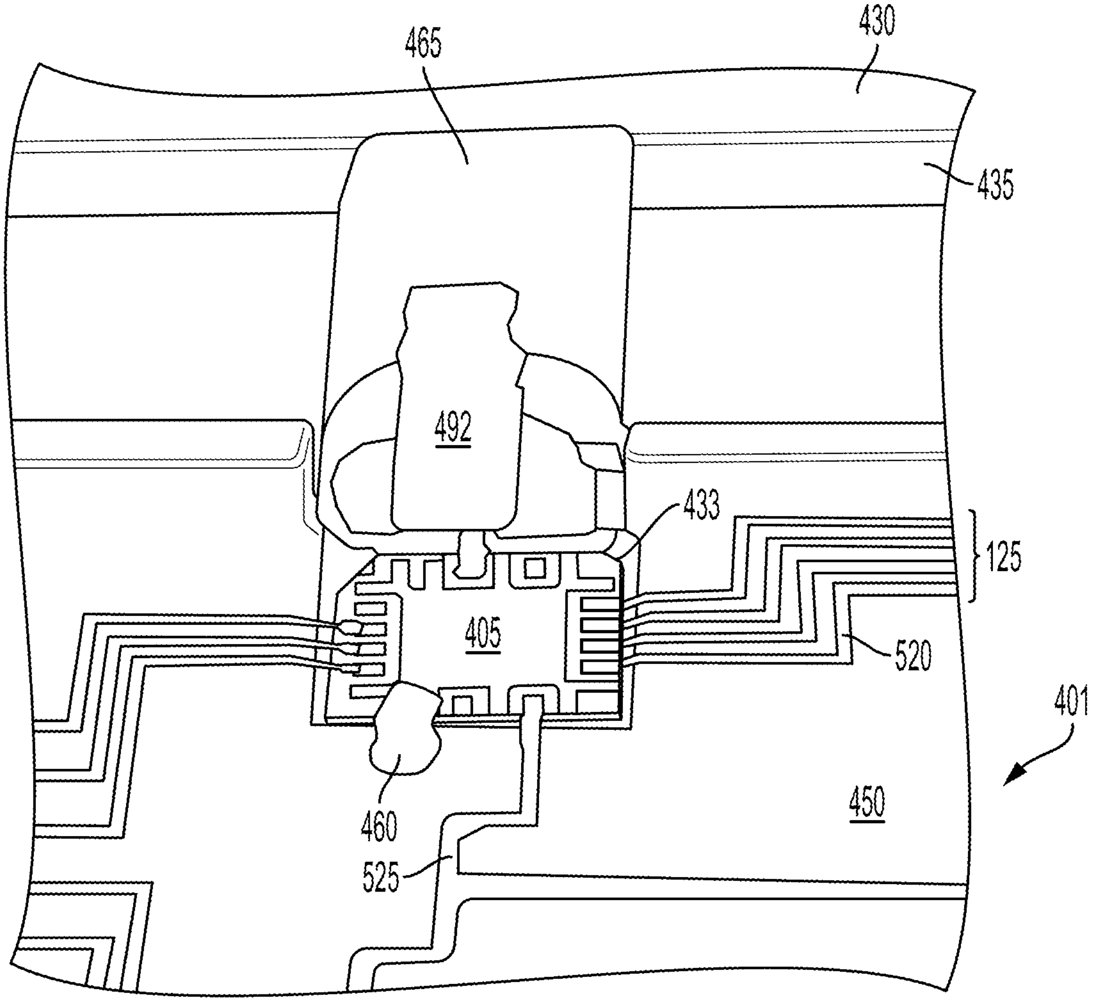
FIG. 9 is a zoomed in view of one of the phase shifter ICs showing the RF and DC interconnects printed across the SU-8 gap fill according to multiple embodiments of this disclosure.

Particularly shown in FIG. 8C, vias 460 were fabricated in the SU-8 layer, by leaving voids, and the vias are used in fabricating the ground connections for the phase shifters and the SMP connector used for measurements. A full EM simulation was conducted in CST Microwave Studio incorporating the full 2×2 antenna structure and the RF/DC feeding. Additional ports were added to the simulation model to incorporate the S-Parameters of the phase shifters.

For a proof-of-concept technology demonstration that is not limiting of the disclosure, a 2×2 array was fabricated. To start, the 2×2 array main antenna structure, i.e., antenna 400, is 3D printed on the FormLabs Form 3 printer using High-Temperature resin as shown in FIGS. 8A, 8B. The High Temperature resin was chosen because it can withstand the sintering temperature of the silver nanoparticles and SU-8 curing steps. In one example embodiment, the antenna 400 is divided into three different parts, the main antenna body 401 of the antenna 400, a microstrip feed 492, and the waveguide endcaps 465A, 465B, 465C, 465D. The 3D printed antenna body 401 and the waveguide endcaps 465A-465D were metalized with silver paste. The microstrip probe feeding structure 492A, 492B, 492C, 492D was printed so that it extends to half of the distance of the waveguide width on the waveguide endcap 465A-465D. The SU-8 layers, i.e., substrate 450, are then inkjet-printed onto the flat area, i.e., the printing surface 425, of the antenna 400. After UV exposure and hard baking at 150° C., the RF feedlines 520 and DC feedlines 525 are inkjet-printed on top of the SU-8 substrate 450. Four layers of SunTronic EMD5730 silver nanoparticle ink was printed at 20 μm drop spacing, on top of the SU-8 substrate 450, and sintered at 150° C. as shown in FIG. 8D. Because inkjet-printed traces are not solderable, and the usage of conductive epoxies tends to short the pads of the monolithic microwave integrated circuits (MMICs), the traditional chip placement methods are not suitable. To mitigate this problem the phase shifter MMICs are "flipped" to expose the ground paddle and pads, which facilitates the inkjet printing of the interconnects 428 between the chips, the integrated circuits 455, and the RF and DC feeds 520, 525. These MMICs are adhered to the antenna body 401 in the built in phase shifter housing cavity 490 and pads aligned with the RF and DC lines 520, 525. To bridge this cavity a dielectric material must be utilized to fill this gap, called gap-fill 433. SU-8 was again utilized to fill this gap, because the epoxy based SU-8 retains much of its volume after UV exposure and curing. The SU-8 is also liquid which, due to capillary action, forms a very smooth transition between the chip and the feed lines post UV exposure and curing, granting a streamlined transition. The interconnects 428 are then printed with the drop spacing turned to the minimum setting (5 μm), facilitating fast gap-filling. The process needs to be tuned to print the optimal amount of SU-8 gap fill 433 as necessary, otherwise SU-8 gap fill will either overfill and cover the IC contact pads, or form a discontinuity because the gap was underfilled. Therefore the drop spacing is turned up to 20 μm just before the gap is filled in order to prevent overflow and to create a smooth surface for the interconnect. Silver nanoparticle ink was then inkjet-printed onto the surface of the gap-fill to form the interconnects 428. The microstrip probe feeding structure 492 and the waveguide endcaps 465 are then assembled to the main antenna body using silver epoxy. The completed system and the fabrication steps are shown in FIG. 8, with a zoomed in close up of the chip interconnects shown in FIG. 9 clearly demonstrating that the SU-8 gap-fill enables the formation of a streamlined transition.

Each digital phase shifter has 6-bits of resolution, meaning that each phase shifter has 6 DC control inputs with 1 reference voltage, making 7 DC inputs for each phase shifter, and 28 total inputs required. This necessitates the need for a microcontroller to set each phase shifter's control inputs, where setting a "high" activates one bit and a "low" deactivates it. Header pins were attached to DC contact pads easy communication link to the microcontroller.

In some examples, N-way power combiners can be used to integrate multiple tiles together, enabling the easy "on-the-fly" modification of the shape and size of the array. This grants users to utilize a plug-and-play approach, where SoA array tiles can be added, removed or rearranged ad hoc, in a truly scalable fashion.

Figure 10A:
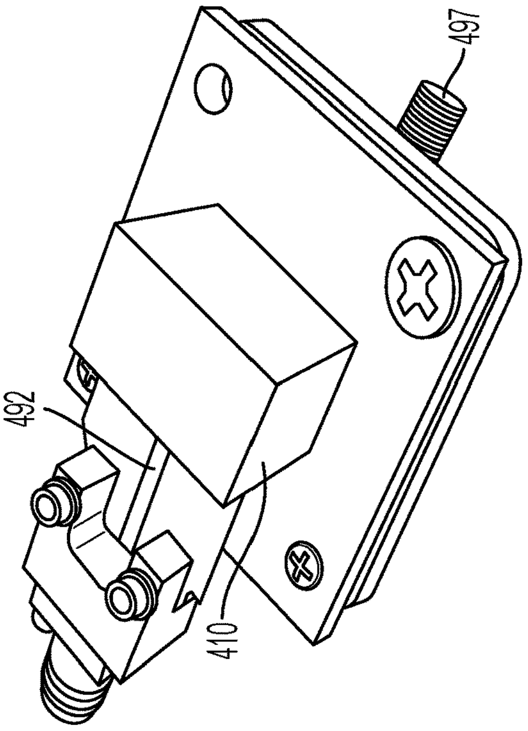
FIG. 10A illustrates a test structure consisting of a microstrip-to-waveguide transition on the top and a standard waveguide-to-coaxial transition on the bottom for the evaluation of the microstrip-to-waveguide transition.
Figure 10B:
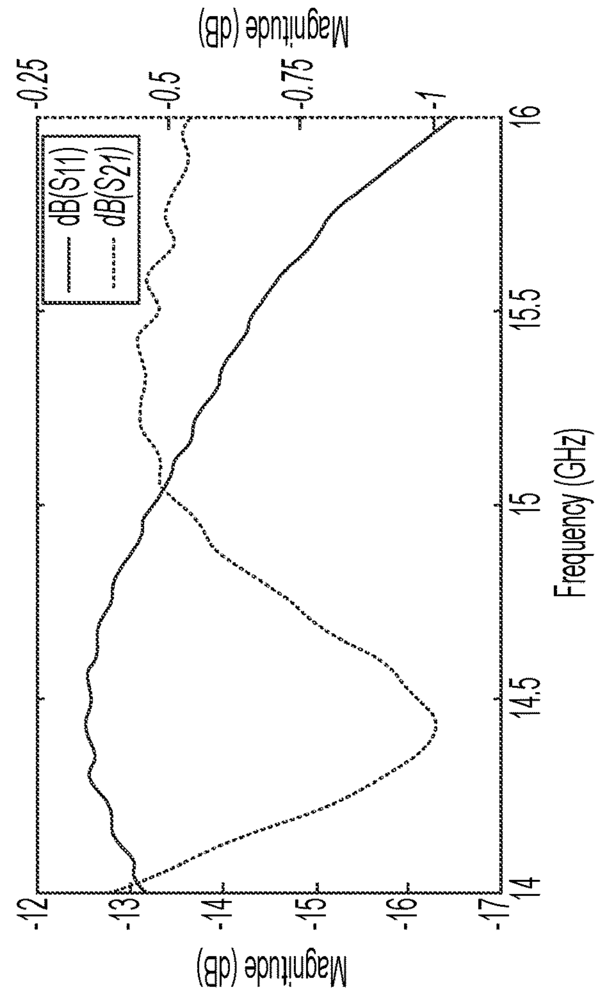
FIG. 10B illustrates a Microstrip-to-waveguide transition return loss and insertion loss, with port 1 being the microstrip port.
Figure 11B:
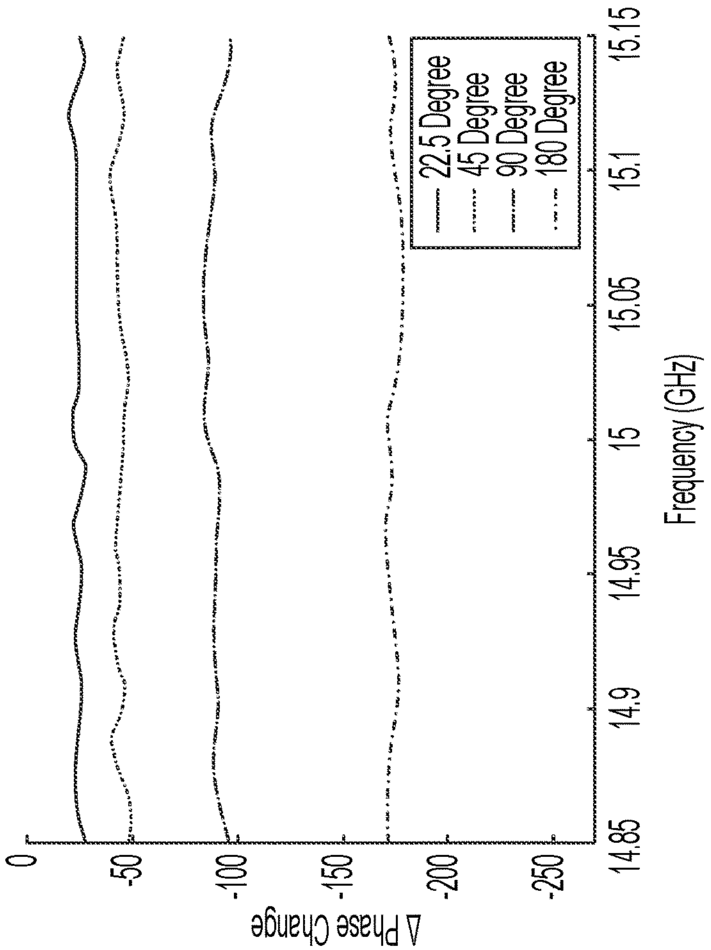
FIG. 11B illustrates a single antenna element measured phase information with 0 degree phase shift as the baseline, and the 22.5, 45, 90 and 180 degree bits are activated at one at a time, with the plot showing the change in phase w.r.t. the baseline. The progression in phase follows closely with the set phase bit value.
Figure 11A:
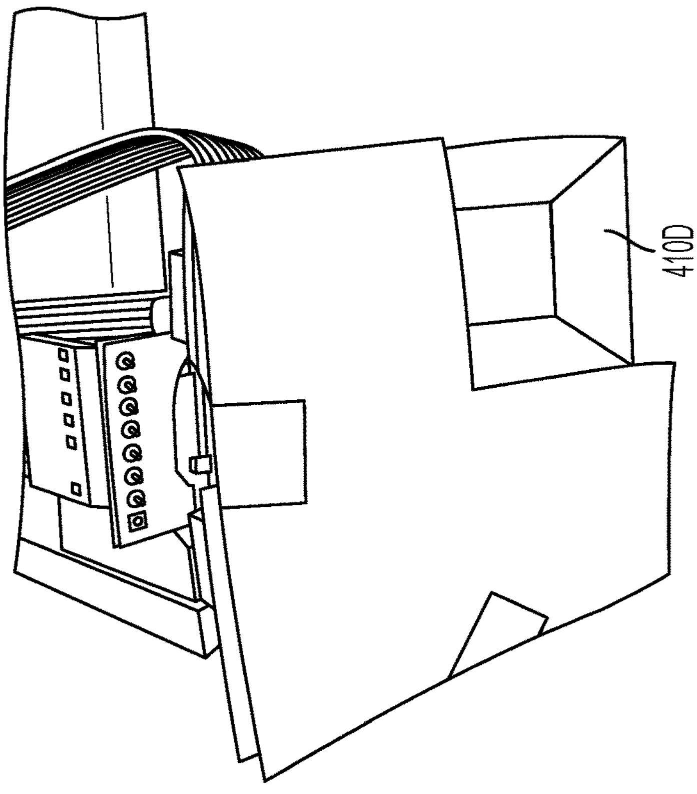
FIG. 11A illustrates a diagnostic test evaluation setup of each individual antenna element with only one element revealed.
Figure 12A:
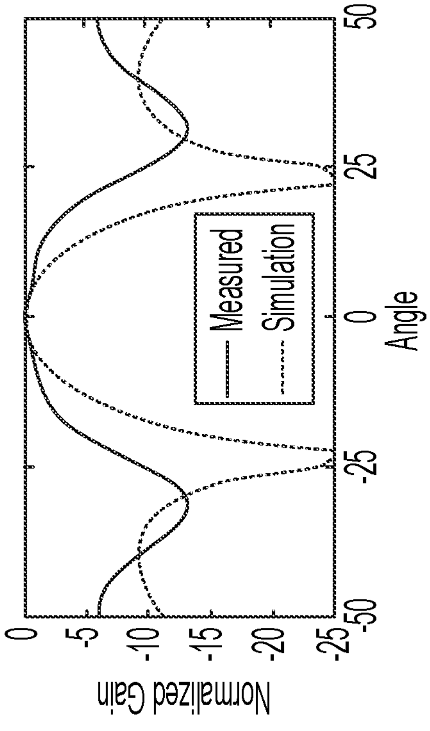
FIG. 12A illustrates phase shifts along the x-axis of the 2×2 SoA Phased array and the resulting beam pattern at 0 degrees.
Figure 12B:
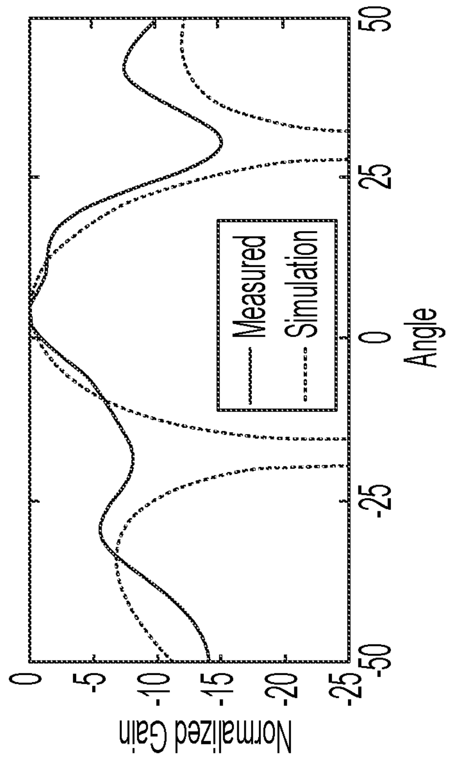
FIG. 12B illustrates phase shifts along the x-axis of the 2×2 SoA Phased array and the resulting beam pattern at 45 degrees.
Figure 12C:
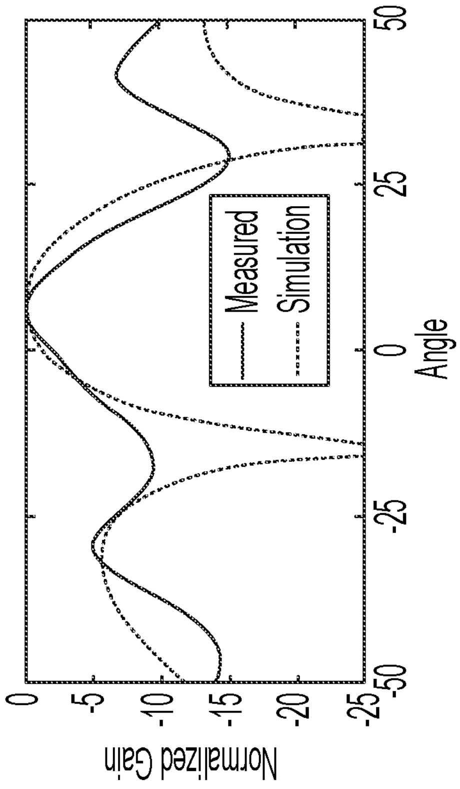
FIG. 12C illustrates phase shifts along the x-axis of the 2×2 SoA Phased array and the resulting beam pattern at 67.5 degrees.
Figure 12D:
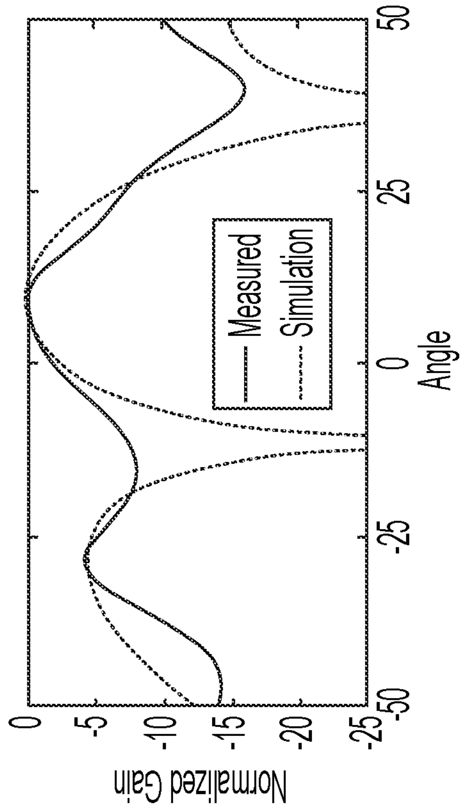
FIG. 12D illustrates phase shifts along the x-axis of the 2×2 SoA Phased array and the resulting beam pattern at 90 degrees.
Figure 12E:
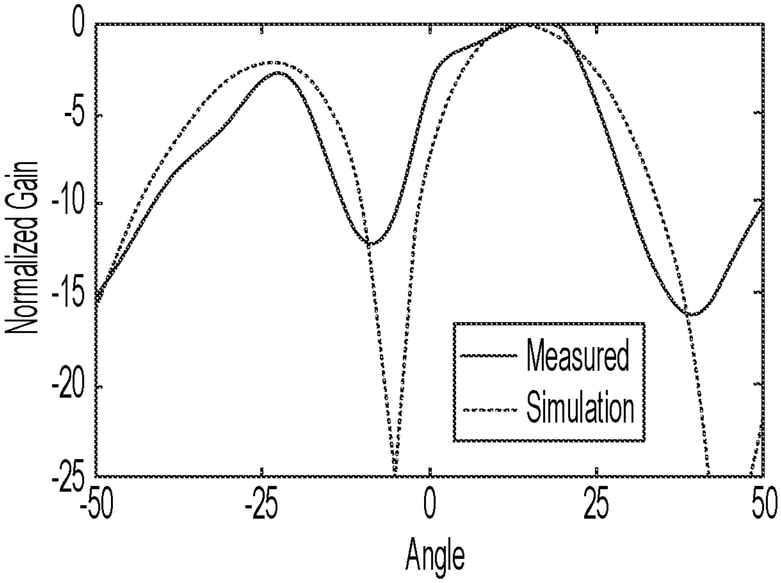
FIG. 12E illustrates phase shifts along the x-axis of the 2×2 SoA Phased array and the resulting beam pattern at 135 degrees which at this angle resulted in a beam angle of around 20 degrees off boresight.

A thorough evaluation of the printable microstrip-to-waveguide transition was performed to optimize its performance. Since this portion is the part that excites the horn antenna elements, it is critical to see how the transition performs and minimize its RF losses. A proof-of-concept prototype transition was fabricated with one end being the microstrip probe feeding structure 492, and the other end being a standard WR62 waveguide-to-coax flange transition 497 as shown in FIG. 10A. All parts are fabricated using the High Temperature Resin from FormLabs using the FormLabs Form 3 3D printer. The microstrip feedline length was larger than what is designed to be used in the SoA to facilitate a SouthWest connector for measurement on a VNA. From this initial evaluation of FIG. 10B, it can be observed that the printed transition features around 0.5 dB insertion loss at around 15 GHz, which is an acceptable loss given the lossy 3D printed materials used in this preliminary evaluation and the fact that the microstrip feedline is longer than what is implemented in the SoA. A diagnostic test was performed initially to ensure that all phase shifters are working as intended. Due to the difficulty of making phase measurements in situ, they were instead taken by measuring the propagated phase from the individual antenna elements. To isolate one individual antenna element, the other horn apertures were covered using a copper sheet to eliminate cross-element interference. FIGS. 11A and 11B show the measurement setup and demonstrates that the individual antenna elements are working as intended.

The phased array beam steering measurement was performed after the diagnostic test, with the radiation pattern shown in FIG. 12. Since this is a 2×2 phased array, it is capable of steering along two axes. Because the array is square, the tuning capability between the horizontal and vertical axis is essentially the same. FIG. 12 demonstrates a progressive phase shift of 45, 67.5, 90, and 135 degrees between two half planes of the antenna. Since this tile is a 2×2 tile, there are limited degrees of freedom in the phase progression which limits the scanning angle. Adding more "tiles" would grant a wider scan angle. Nevertheless, a scan angle of +/−20 degrees was achieved with this 2×2 structure prototype at a progressive phase shift of 135 degrees. It is worth noting that the gain of the phased array was not measured. This is due to two factors. One factor is that there was no amplification built into this module unlike traditional phased arrays. The phase shifters have an inherent 7 dB of insertion loss each [27], meaning that 4 phase shifter combine for at least 13 dB of loss. Additionally the printable dielectric, in this case, SU-8 has a high tan δ of 0.04. Since is a proof-of-concept demonstration of the proposed SoA "tile" technology for massively scalable AM phased array systems, the main goal was to evaluate the beam steering response, not to achieve high gain. High gain can be achieved by adding amplifiers to mitigate the phase shifter losses and utilizing lower loss printable dielectrics for the RF feeding. [28], [29].

In one embodiment, illustrated in FIGS. 1-6, an antenna system 100 utilizes the above noted technology and includes an antenna waveguide 110 having a waveguide surface 115. A set of printed electronics 125 having conductors, i.e., interconnects 128, is deposited onto the waveguide surface 115 of the antenna waveguide 110, and the antenna system further includes at least one transceiver integrated circuit (IC) 150. The transceiver integrated circuit 150 may include a surface assembly 175 incorporating at least one of the integrated circuits 150. The surface assembly 175 is adhesively coupled to the antenna waveguide 110 and directly connected to the waveguide surface 115 of the antenna waveguide 110. The conductors 128 may be printed or deposited silver nanoparticle ink used according to the processes for two dimensional and three dimensional manufacturing techniques described herein.

The structure of the antenna waveguide 110 defines a microstrip cavity 180 for routing an antenna feed structure 192 across the antenna 100. The waveguide surface 115 further defines a housing cavity 190 for receiving the surface assembly 175 of integrated circuits 150 establishing at least one antenna component. The integrated circuits may include at least one transceiver integrated circuit (IC) 150 having a plurality of integrated circuit components 215 generating input electrical waveforms within the RF spectrum for transmission by the antenna 100. The microstrip cavity 180 and the housing cavity 190 each have respective floor sections 199A, 199B that are integral with a wall 196 of the waveguide 110 of the antenna system 100. In one embodiment, the integrated circuits 150 include at least one transceiver integrated circuit 150 positioned within the housing cavity 190.

As noted, the antenna system 100 further includes an antenna feed structure 192 that connects printed electronics 125 on the waveguide surface 115 to establish electronic communications from the housing cavity 190 through the microstrip cavity 180 and on to the antenna waveguide 110. To accomplish this routing, the microstrip cavity 180 may optionally define an opening 215 through the waveguide surface 115 to an interior portion 111 of the antenna waveguide 110.

Another non-limiting embodiment of this disclosure includes an apparatus 400 for wireless communications, and the apparatus 400 may include an antenna body 401 having a plurality of antenna assemblies 405A-405D connected by a waveguide support structure 430, wherein the waveguide support structure 430 defines a printing surface 425 surrounding at least one waveguide opening 435 extending through the waveguide support structure 430. At least one antenna waveguide 410 is connected to the waveguide support structure 430 and is accessible through a respective waveguide opening 435. In this embodiment, a substrate 450 is positioned, via additive manufacturing or otherwise, on the printing surface 425. An antenna transmission feed structure 492 is positioned on the substrate 450 and connects a respective one of the antenna assemblies 405A-405D to a respective antenna waveguide 410 through a respective waveguide opening 435. The antenna transmission feed structure 492 routes input electrical waveforms to the respective waveguide 410 for wireless transmission from the antenna body 401.

Similar to the embodiments described above, the substrate 450 may define at least one microstrip cavity 480 therein. In the embodiments of FIGS. 7-12, the substrate 450 defines at least one housing cavity 490 therein, and wherein at least a portion 408 of a respective antenna assembly 405A-405D is positioned in the at least one housing cavity 490. The portion 408 positioned in the housing cavity 490 may optionally be a phase shifter connected to the respective antenna assembly 405A-405D. Accordingly, the substrate 450 defines open vias 460 in which grounding connectors 462 are positioned for connecting to the antenna assemblies 405A-405D. RF feedlines 520 and DC feedlines 525 may be printed onto the substrate 450 and connect components of the respective antenna assemblies.

In one non-limiting embodiment, the at least one waveguide 410 includes a waveguide end cap 465 connected to the waveguide support structure 430 across the respective waveguide opening 435, and the antenna transmission feed structure 492 extends across a section of the waveguide end cap 465.

Numerous materials may be used in producing the two dimensional printed circuits and three dimensional antenna components. For example, in the embodiments of this disclosure the substrate 450 may be a dielectric layer similar to those described above. The waveguide endcaps 465 and other portions of the antenna may have a silver paste coating. In one embodiment, the antenna transmission feed structure 492 includes silver nanoparticle ink deposited onto the substrate 450.

The apparatuses and systems described in this disclosure may be produced by a method of constructing an antenna system, which in some embodiments begins with printing an antenna body 401 having at least one antenna waveguide 410. By attaching at least one transceiver integrated circuit 405A-405D to the antenna waveguide 410, the antenna body can be subject to depositing a set of printed electronics 125 on the antenna waveguide 410, wherein the printed electronics connect the transceiver integrated circuit 405A-405D to the antenna waveguide 410. The printed electronics route an antenna transmission feed structure 492 from the transceiver integrated circuit 405A-405D to the at least one antenna waveguide 410.

In non-limiting embodiments, the method of manufacturing an antenna system includes printing the antenna body 401 so that the antenna body has a waveguide support structure 430 that connects a plurality of respective waveguides 410, wherein the waveguide support structure 430 surrounds at least one waveguide opening 435 extending through the waveguide support structure 430. The steps of manufacture include connecting at least one of the respective waveguides 410 to the waveguide support structures 430 through a respective waveguide opening 435 and defining a printing surface 425 on the waveguide support structure 430. Printing a substrate 450 on the printing surface 425 provides a support layer for printing an antenna transmission feed structure 492 on the substrate 450. The method then includes connecting at least one antenna assembly 405A-405D to the at least one of the respective waveguides 410 through the respective waveguide opening 435, wherein the antenna transmission feed structure 492 routes input electrical waveforms to the respective waveguide for wireless transmission from the antenna. To accomplish the structures and apparatuses described herein, the method further includes defining at least one microstrip cavity 480 in the substrate 450 prior to printing the antenna transmission feed structure 492, and incorporating the antenna transmission feed structure 492 at least partially within the microstrip cavity 480.

The method of manufacturing set forth in this disclosure may include dividing the antenna body into tiles 470 that pair each of the plurality of respective waveguides 410 with a corresponding antenna assembly 405A-405D and printing respective RF feedlines 520 and DC feedlines 525 on the substrate 450 to connect components of the antenna assemblies. In non-limiting embodiments, the printing an antenna body 401 may utilize 3D additive manufacturing printing and the circuits and interconnects on the waveguides may be printed or deposited according to two dimensional application techniques.

DISCUSSION

As noted above, the wide range of uses for 5G means that there is no one-size-fits-all implementation. At higher frequencies, antennas need to have large gain values in order to overcome the path losses at these higher frequencies. Previous works such as [1], [2], and [3] demonstrates V-B and integrated on-chip/package antennas with low gain individual elements or array antennas. Due to the high frequency at V-B and, antennas need effectively 12-14 dB of additional gain to achieve the same link budgets at lower frequencies like Ku-band. To achieve 12-14 dB more gain requires adding multiple antennas into an array to achieve higher gain, or adding more power, neither of which is optimal nor economically feasible. The cost of adding more amplifiers and multilayer feeding networks and the size increases of adding more antenna elements can drastically reduce the feasibility of widespread integrated antennas.

Some options have been designed in the analog/low-frequency domain [4] using 3D printed electronics, but not yet in the RF domain. Others such as [5] and [6] have demonstrated many different examples of 3D printed horn antennas; however, they do not show any integration with any other devices or chips at the system level.

This is why additively manufactured phased arrays can play a critical role. Phased arrays are a good solution to solve the environmental issue. It allows an antenna array to point to specified locations, greatly enhancing reception and reducing interference. However, phased arrays are generally very expensive, requiring expensive fabrication techniques and many manufacturing steps. This can be mitigated by additive manufacturing (AM). AM is inherently low-cost and low-waste because the material is only utilized where it is needed, unlike subtractive processes. It is also highly customizable, where one tool can create many different designs with very few modifications. The natural solution is to utilize AM for phased array design. The combination of AM and phased arrays allows for highly customizable designs in a low-cost fashion, facilitating the speedy rollout of 5G and IoT-based RF systems.

Additive manufacturing's benefits do not only lie in the fact that it is customizable and low-cost. It can also enable unique designs not feasible using traditional fabrication techniques. The exemplary System on Antenna (SoA) can incorporate Monolithic Microwave Integrated Circuits (MMIC) that are built directly into the body of the antenna structure. Certain exemplary SoA can be achieved using AM techniques as traditional methods of chip integration (e.g., using PCBs) are not suitable for irregular structures, such as the surface of a horn antenna. This design adds additional benefits such as space-saving and low loss since the electronics are built into the body of the antenna, and the feed structure is integrated, meaning that there is no need for PCBs or extensive wires and cables.

Literature has reported many works such as [10]-[13], which feature 3D printed antennas; however, they all lack integration with electronics and MMICs. Similar works based on the system integration of electronics using AM have been shown in [14] using low frequency/analog chips but not in the RF domain. In [15], an MMIC was integrated with an additively manufactured antenna and substrate, but the electronics and antenna were separate entities, not built together. Many works have featured integrating antennas with the electronics packaging or having the electronics and antenna on the same chip [16]-[20]. The problem with these methods of integration is that the antenna sizes are not suitable for long-range communications, especially at high frequencies, due to the limiting sizes of the chip/packaging and, therefore, the resulting antenna aperture.

Additional AM technologies have been used to integrate multiple MMICs into multi-chip modules, such as [21]-[23], but these works do not feature antenna integration, meaning that an antenna still requires additional interconnects in order to communicate with the electronics. More recently, works such as [24] have also explored the concept of SoA. However, in [24], the majority of the design is done in the traditional PCB fashion and is not conformal to the antenna structure, wasting a lot of space.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description. The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

REFERENCES

[1] D. Liu and S. Reynolds, "An aperture-coupled patch antenna in rfic package for 60 ghz applications," in Proceedings of the 2012 IEEE International Symposium on Antennas and Propagation, July 2012, pp. 1-2.

[2] W. E. McKinzie, D. M. Nair, B. A. Thrasher, M. A. Smith, E. D. Hughes, and J. M. Parisi, "60-ghz 2×2 ltcc patch antenna array with an integrated ebg structure for gain enhancement," IEEE Antennas and Wireless Propagation Letters, vol. 15, pp. 1522-1525, 2016.

[3] S. Li, H. T. Nguyen, T. Chi, C. Li, N. Cahoon, A. Kumar, G. Freeman, D. Harame, and H. Wang, "Performance of v-band on-chip antennas in global foundries 45 nm cmos soi process for mm-wave 5g applications," in 2018 IEEE/MTT-S International Microwave Symposium—IMS, June 2018, pp. 1593-1596.

[4] E. Macdonald, R. Salas, D. Espalin, M. Perez, E. Aguilera, D. Muse, and R. B. Wicker, "3d printing for the rapid prototyping of structural electronics," IEEE Access, vol. 2, pp. 234-242, December 2014.

[5] B. Zhang, Z. Zhan, Y. Cao, H. Gulan, P. Linnr, J. Sun, T. Zwick, and H. Zirath, "Metallic 3-d printed antennas for millimeter and submillimeter wave applications," IEEE Transactions on Terahertz Science and Technology, vol. 6, no. 4, pp. 592-600, July 2016.

[6] H. Yao, S. Sharma, R. Henderson, S. Ashrafi, and D. MacFarlane, "Ka band 3d printed horn antennas," in 2017 Texas Symposium on Wireless and Microwave Circuits and Systems (WMCS), March 2017, pp. 1-4.

[7] Y. Fang, J. D. Berrigan, Y. Cai, S. R. Marder, and K. H. Sandhage, "Syntheses of nanostructured cu- and ni-based micro-assemblies with selectable 3-d hierarchical biogenic morphologies," J. Mater. Chem., vol. 22, pp. 1305-1312, 2012. [Online]. Available: http://dx.doi.org/10.1039/C1JM13884G

[8] Metal Finishing, vol. 110, no. 9A, p. 866, 2012.

[9] X. He, Y. Fang, R. A. Bahr, and M. M. Tentzeris, "Rf systems on antenna (soa): a novel integration approach enabled by additive manufacturing," in 2020 IEEE MTT-S International Microwave Symposium (IMS), June 2020.

[10] B. Zhang, Z. Zhan, Y. Cao, H. Gulan, P. Linn'er, J. Sun, T. Zwick, and H. Zirath, "Metallic 3-d printed antennas for millimeter—and submillimeter wave applications," IEEE Transactions on Terahertz Science and Technology, vol. 6, no. 4, pp. 592-600, July 2016.

[11] H. Yao, S. Sharma, R. Henderson, S. Ashrafi, and D. MacFarlane, "Ka band 3d printed horn antennas," in 2017 Texas Symposium on Wireless and Microwave Circuits and Systems (WMCS), March 2017, pp. 1-4.

[12] K. Kotz'e and J. Gilmore, "Slm 3d-printed horn antenna for satellite communications at x-band," in 2019 IEEE-APS Topical Conference on Antennas and Propagation in Wireless Communications (APWC), 2019, pp. 148-153.

[13] P. Ratajczak, "Design of a 3d printed omnidirectional antenna for 60 ghz application," in 2019 13th European Conference on Antennas and Propagation (EuCAP), 2019, pp. 1-4.

[14] E. M. et al., "3d printing for the rapid prototyping of structural electronics," IEEE Access, vol. 2, pp. 234-242, December 2014.

[15] T. Lin, R. Bahr, M. M. Tentzeris, P. M. Raj, V. Sundaram, and R. Tummala, "Novel 3d-/inkjet-printed flexible on-package antennas, packaging structures, and modules for broadband 5g applications," in 2018 IEEE 68th Electronic Components and Technology Conference (ECTC), 2018, pp. 214-220.

[16] Y. Zhang and J. Mao, "An overview of the development of antenna-in-package technology for highly integrated wireless devices," Proceedings of the IEEE, vol. 107, no. 11, pp. 2265-2280, 2019.

[17] D. G. Kam, D. Liu, A. Natarajan, S. K. Reynolds, and B. A. Floyd, "Organic packages with embedded phased-array antennas for 60-ghz wireless chipsets," IEEE Transactions on Components, Packaging and Manufacturing Technology, vol. 1, no. 11, pp. 1806-1814, 2011.

[18] D. Liu and S. Reynolds, "An aperture-coupled patch antenna in rfic package for 60 ghz applications," in Proceedings of the 2012 IEEE International Symposium on Antennas and Propagation, July 2012, pp. 1-2.

[19] W. E. McKinzie, D. M. Nair, B. A. Thrasher, M. A. Smith, E. D. Hughes, and J. M. Parisi, "60-ghz2×2ltcc patch antenna array with an integrated ebg structure for gain enhancement," IEEE Antennas and Wireless Propagation Letters, vol. 15, pp. 1522-1525, 2016.

[20] S. Li, H. T. Nguyen, T. Chi, C. Li, N. Cahoon, A. Kumar, G. Freeman, D. Harame, and H. Wang, "Performance of v-band on-chip antennas in globalfoundries 45 nm cmos soi process for mm-wave 5g applications," in 2018 IEEE/MTT-S International Microwave Symposium—IMS, June 2018, pp. 1593-1596.

[21] X. He, B. K. Tehrani, R. Bahr, W. Su, and M. M. Tentzeris, "Additively manufactured mm-wave multichip modules with fully printed "smart" encapsulation structures," IEEE Transactions on Microwave Theory and Techniques, vol. 68, no. 7, pp. 2716-2724, 2020.

[22] T. Merkle, R. G'otzen, J. Choi, and S. Koch, "Polymer multichip module process using 3-d printing technologies for d-band applications," IEEE Trans. Microw. Theory Techn., vol. 63, no. 2, pp. 481-493, February 2015.

[23] T. Merkle and R. G"otzen, "Millimeter-wave surface mount technology for 3-d printed polymer multichip modules," IEEE Transactions on Components, Packaging and Manufacturing Technology, vol. 5, no. 2, pp. 201-206, February 2015.

[24] V. Gjokaj, J. Papapolymerou, J. D. Albrecht, B. Wright, and P. Chahal, "A compact receive module in 3-d printed vivaldi antenna," IEEE Transactions on Components, Packaging and Manufacturing Technology, vol. 10, no. 2, pp. 343-346, 2020.

[25] A. Ghannam, C. Viallon, D. Bourrier, and T. Parra, "Dielectric microwave characterization of the su-8 thick resin used in an above is process," in 2009 European Microwave Conference (EuMC), September 2009, pp. 1041-1044.

[26] B. K. Tehrani, C. Mariotti, B. S. Cook, L. Roselli, and M. M. Tentzeris, "Development, characterization, and processing of thin and thick inkjet-printed dielectric films, " Organic Electronics, vol. 29, pp. 135-141, 2016. [Online]. Available: http://www.sciencedirect.com/science/article/pii/S1566119915302032

[27] TGP2615 15-19 GHz 6-Bit Digital Phase Shifter, Qorvo, 12 2019, rev. B.

[28] R. Czarny, T. Q. V. T. Q. Hoang, B. Loiseaux, G. Bellomonte, R. Lebourgeois, A. Leuliet, L. Qassym, C. Galindo, J. Heintz, N. Penin, L. Fourier, C. Elissalde, J. Silvain, T. Fournier, C. Jegou, and P. Pouliguen, "High permittivity, low loss, and printable thermoplastic composite material for rf and microwave applications," in 2018 IEEE Conference on Antenna Measurements Applications (CAMA), 2018, pp. 1-4.

[29] S. Seok, N. Rolland, and P. Rolland, "Design, fabrication and characterization of bcb polymer embedded 60 ghz parallel-coupled bpf," in 2010 Proceedings 60th Electronic Components and Technology Conference (ECTC), 2010, pp. 501-505.

The invention claimed is:

1. An antenna system comprising:

an antenna waveguide comprising a waveguide surface;

a set of printed electronics comprising conductors deposited onto the waveguide surface of the antenna waveguide; and at least one transceiver integrated circuit (IC), the transceiver integrated circuit comprising a surface assembly, the surface assembly being adhesively coupled to the antenna waveguide and directly connected to the waveguide surface of the antenna waveguide; and wherein the antenna waveguide defines a microstrip cavity; and the antenna system further comprises an antenna feed structure that connects the printed electronics to the antenna waveguide through the microstrip cavity.

2. The antenna system according to claim 1, wherein the conductors comprise silver nanoparticle ink.

3. The system according to claim 1, wherein the waveguide surface further defines a housing cavity for receiving the surface assembly of the transceiver integrated circuit, wherein the housing cavity and the microstrip cavity each comprise respective floor sections that are integral with a wall of the waveguide of the antenna system.

4. The apparatus according to claim 1, wherein the microstrip cavity defines an opening through the waveguide surface to an interior portion of the antenna waveguide.

5. The apparatus according to claim 1, wherein the waveguide surface further defines a housing cavity for receiving the surface assembly of the transceiver integrated circuit, and wherein the antenna feed structure comprises a source feed transition line connecting the surface assembly in the housing cavity to the antenna waveguide through the microstrip cavity.

6. The apparatus of claim 1, wherein the at least one transceiver integrated circuit (IC) comprises a plurality of integrated circuit components generating input electrical waveforms within the RF spectrum.

7. The apparatus of claim 6, wherein the integrated circuit components comprise a voltage controlled oscillator and a power amplifier embedded into a housing cavity defined within the waveguide surface.

8. The apparatus of claim 7, wherein the at least one transceiver integrated circuit (IC) is connected to a heat sink structure positioned in the housing cavity of the waveguide surface.

9. An apparatus for wireless communications, the apparatus comprising:

an antenna body comprising a plurality of antenna assemblies connected by a waveguide support structure, wherein the waveguide support structure comprises a printing surface surrounding at least one waveguide opening extending through the waveguide surface;

at least one antenna waveguide connected to the waveguide surface and accessible through a respective waveguide opening;

a substrate on the printing surface;

an antenna transmission feed structure positioned on the substrate and connecting a respective one of the antenna assemblies to a respective antenna waveguide through the respective waveguide opening, wherein the antenna transmission feed structure routes input electrical waveforms to the respective waveguide for wireless transmission from the antenna body.

10. An apparatus according to claim 9, wherein the substrate defines at least one microstrip cavity therein.

11. The apparatus according to claim 9, wherein the substrate defines at least one housing cavity therein, and wherein at least a portion of a respective antenna assembly is positioned in the at least one housing cavity.

12. The apparatus according to claim 11, wherein the portion positioned in the housing cavity is a phase shifter connected to the respective antenna assembly.

13. The apparatus according to claim 9, wherein the substrate defines open vias in which grounding connectors are positioned for connecting to the antenna assemblies.

14. The apparatus according to claim 9, further comprising RF and DC feedlines printed onto the substrate and connecting to components of the respective antenna assemblies.

15. The apparatus according to claim 9, wherein the at least one waveguide comprises a waveguide end cap connected to the waveguide surface across the respective waveguide opening, and the antenna transmission feed structure extends across a section of the waveguide end cap.

16. The apparatus according to claim 9, wherein the substrate comprises a dielectric layer.

17. The apparatus according to claim 9, wherein the waveguide endcaps comprise a silver paste coating.

18. The apparatus according to claim 9, wherein the antenna transmission feed structure comprises silver nanoparticle ink deposited onto the substrate.

19. A method of constructing an antenna system, the method comprising:

printing an antenna body having at least one antenna waveguide;

attaching at least one transceiver integrated circuit to the antenna waveguide;

depositing a set of printed electronics on the antenna waveguide, wherein the printed electronics connect the transceiver integrated circuit to the antenna waveguide, and using the printed electronics to route an antenna transmission feed structure from the transceiver integrated circuit to the at least one antenna waveguide.

20. The method of claim 19, further comprising:

printing the antenna body having a waveguide support structure connecting a plurality of respective waveguides, wherein the waveguide support structure surrounds at least one waveguide opening extending through the waveguide support structure;

connecting at least one of the respective waveguides to the support structures through a respective waveguide opening;

defining a printing surface on the support structure;

printing a substrate on the printing surface;

printing an antenna transmission feed structure on the substrate; and connecting at least one antenna assembly to the at least one of the respective waveguides through the respective waveguide opening, wherein the antenna transmission feed structure routes input electrical waveforms to the respective waveguide for wireless transmission from the antenna.

21. The method of claim 20, further comprising defining at least one microstrip cavity in the substrate prior to printing the antenna transmission feed structure, and incorporating the antenna transmission feed structure at least partially within the microstrip cavity.

22. The method of claim 19, further comprising dividing the antenna body into tiles that pair each of the plurality of respective waveguides with a corresponding antenna assembly and printing respective RF feedlines and DC feedlines on the substrate to connect components of the antenna assemblies.

23. The method of claim 19, wherein the printing an antenna body comprises 3D additive manufacturing printing.

* * * * *